United States Patent
Xiao et al.

(10) Patent No.: US 10,455,195 B2
(45) Date of Patent: Oct. 22, 2019

(54) METHOD AND SYSTEM FOR CONTROLLING MULTIPLE AUXILIARY STREAMS, CONTROL DEVICE, AND NODE

(71) Applicant: Huawei Technologies Co., Ltd., Shenzhen (CN)

(72) Inventors: Jing Xiao, Shenzhen (CN); Jing Wang, Shenzhen (CN); Jiaoli Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/136,478

(22) Filed: Apr. 22, 2016

(65) Prior Publication Data

US 2016/0241813 A1 Aug. 18, 2016

Related U.S. Application Data

(63) Continuation of application No. PCT/CN2013/085935, filed on Oct. 25, 2013.

(51) Int. Cl.
*H04N 7/15* (2006.01)
*H04L 29/06* (2006.01)
*H04L 29/08* (2006.01)

(52) U.S. Cl.
CPC ............ *H04N 7/152* (2013.01); *H04L 29/06* (2013.01); *H04L 29/08* (2013.01);
(Continued)

(58) Field of Classification Search
USPC ........................................ 348/14.9
See application file for complete search history.

(56) References Cited

U.S. PATENT DOCUMENTS

| | | | |
|---|---|---|---|
| 9,600,543 B1 * | 3/2017 | Cionca | G06F 17/30554 |
| 2002/0033880 A1 * | 3/2002 | Sul | H04N 7/152 |
| | | | 348/14.09 |

(Continued)

FOREIGN PATENT DOCUMENTS

| | | |
|---|---|---|
| CN | 101459816 A | 6/2009 |
| CN | 102572367 A | 7/2012 |
| CN | 102868880 A | 1/2013 |

OTHER PUBLICATIONS

Hautakorpi, J., et al., "The Session Description Protocol (SDP) Content Attribute," RFC 4796, Feb. 2007, 11 pages.
(Continued)

*Primary Examiner* — Amal S Zenati
(74) *Attorney, Agent, or Firm* — Conley Rose, P.C.

(57) ABSTRACT

A method and system for controlling multiple auxiliary streams, a control device, and a node, which implements sending and receiving of multiple auxiliary streams of multiple nodes. The method includes determining, by a control device, to allocate a token to m auxiliary streams, where the m auxiliary streams belong to n node or nodes, $n \geq 1$, $m \geq 2$, and $m \geq n$, allocating a token to the m auxiliary streams, sending a token allocated to an auxiliary stream of a first node to the first node, where the first node is one node of the n node or nodes, and sending a first indication message to the first node, where the first indication message is used to instruct the first node to send a first auxiliary stream according to the received token, and the first auxiliary stream includes at least one auxiliary stream of the m auxiliary streams.

15 Claims, 11 Drawing Sheets

(52) U.S. Cl.
CPC ........ *H04L 65/1083* (2013.01); *H04L 65/403* (2013.01); *H04L 65/60* (2013.01)

(56) References Cited

U.S. PATENT DOCUMENTS

| | | | | |
|---|---|---|---|---|
| 2007/0256124 | A1* | 11/2007 | Ih | G06F 21/335 726/9 |
| 2012/0263286 | A1* | 10/2012 | Liao | H04L 12/1818 379/202.01 |
| 2012/0317483 | A1 | 12/2012 | Shapiro et al. | |
| 2013/0265380 | A1 | 10/2013 | Wu et al. | |
| 2014/0139618 | A1 | 5/2014 | Ye et al. | |
| 2014/0327731 | A1 | 11/2014 | Wang | |

OTHER PUBLICATIONS

"Series H: Audiovisual and Multimedia Systems, Infrastructure of audiovisual services—Systems aspects, Role Management and additional media channels for H.300-series terminals," ITU-T, H.239, Sep. 2005, 32 pages.

"Series H: Audiovisual and Multimedia Systems, Infrastructure of audiovisual services—Systems and terminal equipment for audiovisual services, Packet-based multimedia communications systems, Amendment 1: Use of Facility message to enable call transfer," ITU-T, H.323, Amendment 1, Mar. 2013, 8 pages.

"Series H: Audiovisual and Multimedia Systems, Infrastructure of audiovisual services—Communication procedures, Implementors Guide for Recommendations of the H.320 System ("Narrow-band visual telephone systems and terminal equipment"): H.320, H.221, H.224, H.230, H.242, H.243," ITU-T, H.320 System Implementors' Guide, Nov. 26, 2004, 9 pages.

Foreign Communication From A Counterpart Application, European Application No. 13896107.3, Extended European Search Report dated Aug. 30, 2016, 11 pages.

Foreign Communication From A Counterpart Application, PCT Application No. PCT/CN2013/085935, English Translation of International Search Report dated Jul. 29, 2014, 2 pages.

Foreign Communication From A Counterpart Application, PCT Application No. PCT/CN2013/085935, English Translation of Written Opinion dated Jul. 29, 2014, 11 pages.

* cited by examiner

METHOD AND SYSTEM FOR CONTROLLING MULTIPLE AUXILIARY STREAMS, CONTROL DEVICE, AND NODE

CROSS-REFERENCE TO RELATED APPLICATIONS

This application is a continuation of International Patent Application No. PCT/CN2013/085935, filed Oct. 25, 2013, which is hereby incorporated by reference in its entirety.

TECHNICAL FIELD

The present disclosure relates to the communications field, and in particular, to a method and system for controlling multiple auxiliary streams, a control device, and a node.

BACKGROUND

With development in the videoconferencing field, a user conference site has developed from one video camera, single channel of live video, and a single channel of live image to multiple cameras, multiple channels of live videos, and multiple channels of live images. The multiple video cameras, multiple channels of live videos, and multiple channels of live images at the same conference site are associated via a physical or logical relationship. When a conference subject needs to be discussed in a video conference, a video of conference content (for example, power point (PPT)) usually needs to be transmitted to each conference site such that the conference content may be displayed on a content display at a remote conference site. Implementation of the technology relies on a definition of a role of an auxiliary stream in the H.323 and H.239 protocols in the prior art. The protocols specify that an auxiliary stream is used to transmit an image of conference content, such as a PPT slide and a digital video disc (DVD) video.

An auxiliary stream form that is commonly used at present is a presentation (PRE) form. In the PRE form, a token management mode is used. A conference has only one presentation token, a conference site that obtains the token may send an auxiliary stream, and the auxiliary stream of the conference site that has the token is viewed at each conference site. When the conference site stops sending an auxiliary stream, the token may be released. When another conference site needs to send an auxiliary stream, the other conference site may obtain the token by requesting, and all applicants may request the token as long as the token is not locked. However, in an actual common conference, a general scenario is that a projected physical object is being viewed and a slide is being presented at the same time. When this scenario is extended to and applied in the videoconferencing field, it is required that a conference site that obtains a token is capable of simultaneously sending two auxiliary streams of images, and that the two auxiliary streams may be simultaneously broadcast to another conference site of the conference for viewing. The existing PRE form cannot meet the requirement of the foregoing scenario in which multiple auxiliary streams are managed by using a token.

To solve the foregoing problem, a solution for controlling multiple auxiliary streams is proposed in the prior art. In this solution, an extra presentation annex (PREAnnex) logic channel is extended to improve a single node's capability of sending an auxiliary stream such that a node that obtains a presentation token by means of application may send an extra auxiliary stream through the PREAnnex logic channel. Sending of multiple auxiliary streams may be implemented by using this method. However, a node may send multiple auxiliary streams only after the node obtains a token by means of application. When an auxiliary stream needs to be simultaneously sent at multiple conference sites in a conference, the solution still cannot be used to solve the problem.

SUMMARY

Embodiments of the present disclosure provide a method and system for controlling multiple auxiliary streams, a control device, and a node, which may implement sending and receiving of multiple auxiliary streams by multiple nodes.

To achieve the foregoing objective, the following technical solutions are adopted in the embodiments of the present disclosure.

According to a first aspect, a method for controlling multiple auxiliary streams is provided. The method includes determining to allocate a token to m auxiliary streams, where the m auxiliary streams belong to n node, n≥1, m≥2, and m≥n, allocating the token to the m auxiliary streams, sending the token allocated to an auxiliary stream of a first node to the first node, where the first node is one node of the n node, and sending a first indication message to the first node, where the first indication message is used to instruct the first node to send a first auxiliary stream according to the received token, and the first auxiliary stream includes at least one auxiliary stream of the m auxiliary streams.

In a first possible implementation manner of the first aspect, with reference to the first aspect, before the determining to allocate a token to m auxiliary streams, the method further includes receiving a request message from the n, where the request message from the n node is used to request to acquire a token required for sending the m auxiliary streams, the determining to allocate a token to m auxiliary streams further includes searching, according to the request message from the n node, for pre-stored token information, where the token information is information that represents an occupancy status of a token, and determining, when the token information represents that the token required by the m auxiliary streams is not occupied, to allocate the token to the m auxiliary streams, the allocating a token to the m auxiliary streams includes allocating, according to the token information, the token required by the m auxiliary streams to the m auxiliary streams, and after the allocating a token to the m auxiliary streams, the method further includes updating the token information.

In a second possible implementation manner of the first aspect, with reference to the first possible implementation manner of the first aspect, the token is a first token corresponding to a node, the token information includes a quantity of idle tokens, and a correspondence between a used token and a token-allocated node, the determining, when the token information represents that the token required by the m auxiliary streams is not occupied, to allocate the token to the m auxiliary streams further includes when the quantity of idle tokens is not less than n, determining to allocate the token to the m auxiliary streams, and the updating the token information includes updating, in the token information, the quantity of idle tokens, and information about the correspondence between a used token and a token-allocated node.

In a third possible implementation manner of the first aspect, with reference to the first possible implementation manner of the first aspect, the token is a second token corresponding to an auxiliary stream, the token information includes a quantity of idle tokens, and a correspondence between a used token and a token-allocated auxiliary stream of a node, the determining, when the token information represents that the token required by the m auxiliary streams is not occupied, to allocate the token to the m auxiliary streams further includes when the quantity of idle tokens is not less than m, determining to allocate the token to the m auxiliary streams, and the updating the token information includes updating, in the token information, the quantity of idle tokens, and information about the correspondence between a used token and a token-allocated auxiliary stream of a node.

In a fourth possible implementation manner of the first aspect, with reference to the first possible implementation manner of the first aspect, the token is a child token corresponding to an auxiliary stream, where the child token has a corresponding parent token, and the parent token is a first token corresponding to a node, the token information includes a quantity of idle parent tokens, a quantity of idle child tokens included in each idle parent token, a correspondence between a used parent token and a token-allocated node, a correspondence between the used parent token and a quantity of idle child tokens included in the used parent token, and a correspondence between a used child token included in the used parent token and a token-allocated auxiliary stream, the determining, when the token information represents that the token required by the m auxiliary streams is not occupied, to allocate the token to the m auxiliary streams further includes when a quantity of tokens requested by a second node in the n node is not greater than a quantity of idle child tokens included in a parent token corresponding to the second node, a quantity of third nodes in the n node is not greater than the quantity of idle parent tokens in the token information, and a quantity of tokens requested by each third node is not greater than a quantity of idle child tokens included in a parent token corresponding to the third node, determining to allocate the token to the m auxiliary streams, where the second node is a node to which a used parent token are allocated, and the third node is a node to which no parent token is allocated, and the updating the token information includes updating, in the token information, the quantity of idle parent tokens, the quantity of idle child tokens included in each idle parent token, the correspondence between a used parent token and a token-allocated node, the correspondence between a used parent token and a quantity of idle child tokens included in the used parent token, and the correspondence between a used child token included in a used parent token and a token-allocated auxiliary stream.

In a fifth possible implementation manner of the first aspect, with reference to the first aspect, before the determining to allocate a token to m auxiliary streams, the method further includes receiving auxiliary stream resource information reported by a controlled node, where the auxiliary stream resource information is information that represents an auxiliary stream included in the controlled node, determining, according to the auxiliary stream resource information, an auxiliary stream to which a token may be allocated, matching a reserved token with the auxiliary stream to which a token may be allocated in order to acquire a correspondence between a token and an auxiliary stream, the determining to allocate a token to m auxiliary streams further includes determining, according to an allocation policy, to allocate the token to the m auxiliary streams, and the allocating a token to the m auxiliary streams includes allocating, according to the acquired correspondence between a token and an auxiliary stream, the token required by the m auxiliary streams to the m auxiliary streams.

In a sixth possible implementation manner of the first aspect, with reference to the fifth possible implementation manner of the first aspect, the auxiliary stream resource information further includes a quantity of auxiliary streams included in each controlled node, and/or a type of an auxiliary stream included in each controlled node, and/or a brief description of an auxiliary stream included in each controlled node.

In a seventh possible implementation manner of the first aspect, with reference to the fifth possible implementation manner of the first aspect and the sixth possible implementation manner of the first aspect, the auxiliary stream resource information includes a node number corresponding to an auxiliary stream included in each controlled node, and the matching a reserved token with the auxiliary stream to which a token may be allocated further includes matching, according to a first rule, the reserved token with the auxiliary stream to which a token may be allocated, where the first rule is as follows: a token is allocated by node, and auxiliary streams with a same node number are allocated a same token.

In an eighth possible implementation manner of the first aspect, with reference to the fifth possible implementation manner of the first aspect and the sixth possible implementation manner of the first aspect, the auxiliary stream resource information includes an identifier of an auxiliary stream included in each controlled node, and the matching a reserved token with the auxiliary stream to which a token may be allocated further includes matching, according to a second rule, the reserved token with the auxiliary stream to which a token may be allocated, where the second rule is as follows: a token is allocated by auxiliary stream, and auxiliary streams with different auxiliary stream identifiers are allocated different tokens.

In a ninth possible implementation manner of the first aspect, with reference to the fifth possible implementation manner of the first aspect and the sixth possible implementation manner of the first aspect, the auxiliary stream resource information includes a node number corresponding to an auxiliary stream included in each controlled node, and an identifier of the auxiliary stream included in each controlled node, and the matching a reserved token with the auxiliary stream to which a token may be allocated further includes matching, according to a third rule, the reserved token with the auxiliary stream to which a token may be allocated, where the third rule is as follows: a parent token is allocated by node, and auxiliary streams with a same node number are allocated a same parent token, for auxiliary streams that have a same parent token, a child token is allocated by auxiliary stream, and auxiliary streams with different auxiliary stream identifiers are allocated different child tokens.

In a tenth possible implementation manner of the first aspect, with reference to the first aspect to the ninth possible implementation manner of the first aspect, after the sending a first indication message to the first node, the method further includes acquiring the first auxiliary stream sent by the first node, and sending the first auxiliary stream to a fourth node.

In an eleventh possible implementation manner of the first aspect, with reference to the tenth possible implementation manner of the first aspect, before the sending a first indication message to the first node, the method further includes receiving a first request message sent by the fourth node, where the first request message is used to request to acquire the first auxiliary stream, and the sending a first indication message to the first node includes sending the first indication message to the first node according to the first request message.

In a twelfth possible implementation manner of the first aspect, with reference to the tenth possible implementation manner of the first aspect, the sending a first indication message to the first node includes sending the first indication message to the first node according to a control policy.

In a thirteenth possible implementation manner of the first aspect, with reference to the twelfth possible implementation manner of the first aspect, before the sending the first auxiliary stream to a fourth node, the method further includes sending a query message, where the query message is used to query whether the fourth node may receive the first auxiliary stream, and receiving a confirmation message sent by the fourth node, where the confirmation message is used to indicate that the fourth node may receive the first auxiliary stream.

According to a second aspect, a method for controlling multiple auxiliary streams is provided. The method includes acquiring, by a node from a control device, a token required by at least one auxiliary stream, determining, by the node, a type of the token, receiving, by the node, a first indication message sent by the control device, where the first indication message is used to instruct the node to send a first auxiliary stream, and sending, by the node, the first auxiliary stream according to the determined type of the token when the token required by the at least one auxiliary stream includes a token required by the first auxiliary stream.

In a first possible implementation manner of the second aspect, with reference to the second aspect, before the acquiring, by a node from a control device, a token required by at least one auxiliary stream, the method further includes sending a request message to the control device, where the request message is used to request to acquire the token required for sending the at least one auxiliary stream.

In a second possible implementation manner of the second aspect, with reference to the first possible implementation manner of the second aspect, the type of the token is a first token corresponding to a node and is a token for multiple auxiliary streams, and the sending, by the node, the first auxiliary stream according to the determined type of the token when the token required by the at least one auxiliary stream includes a token required by the first auxiliary stream further includes establishing M auxiliary stream channels corresponding to the token required by the first auxiliary stream, where M is a quantity of auxiliary streams included in the first auxiliary stream, and sending the first auxiliary stream through the M auxiliary stream channels.

In a third possible implementation manner of the second aspect, with reference to the first possible implementation manner of the second aspect, the token is a first token corresponding to a node and is a token for a single auxiliary stream, and the sending, by the node, the first auxiliary stream according to the determined type of the token when the token required by the at least one auxiliary stream includes a token required by the first auxiliary stream further includes establishing one auxiliary stream channel corresponding to the token required by the first auxiliary stream, and when a quantity of auxiliary streams included in the first auxiliary stream is at least two, synthesizing the auxiliary streams included in the first auxiliary stream such that the first auxiliary stream becomes one auxiliary stream, and sending the synthesized first auxiliary stream through the established auxiliary stream channel, or when a quantity of auxiliary streams included in the first auxiliary stream is one, sending the first auxiliary stream through the established auxiliary stream channel.

In a fourth possible implementation manner of the second aspect, with reference to the first possible implementation manner of the second aspect, the token is a second token corresponding to an auxiliary stream, or the token is a child token that is corresponding to an auxiliary stream and has a corresponding parent token, where the parent token is a first token corresponding to a node, and the sending, by the node, the first auxiliary stream according to the determined type of the token when the token required by the at least one auxiliary stream includes a token required by the first auxiliary stream further includes establishing M auxiliary stream channels corresponding to the token required by the first auxiliary stream, where M is a quantity of auxiliary streams included in the first auxiliary stream, and sending the first auxiliary stream through the M auxiliary stream channels.

In a fifth possible implementation manner of the second aspect, with reference to the fourth possible implementation manner of the second aspect, the token is the child token that is corresponding to an auxiliary stream and has a corresponding parent token, and after the sending, by the node, a request message to the control device, and before the acquiring, from a control device, a token required by at least one auxiliary stream, the method further includes acquiring, from the control device, a parent token of a node corresponding to the at least one auxiliary stream, where the parent token includes at least one idle child token in order to acquire the token required by the at least one auxiliary stream.

In a sixth possible implementation manner of the second aspect, with reference to the second aspect, before the acquiring, by a node from a control device, a token required by at least one auxiliary stream, the method further includes sending auxiliary stream resource information of the node to the control device such that after determining, according to the auxiliary stream resource information, an auxiliary stream to which a token may be allocated, the control device matches the auxiliary stream to which a token may be allocated with a reserved token and performs management, and allocates, with reference to an allocation policy, the token to the at least one auxiliary stream, where the auxiliary stream resource information is information that represents an auxiliary stream included in the node.

In a seventh possible implementation manner of the second aspect, with reference to the sixth possible implementation manner of the second aspect, the auxiliary stream resource information further includes a quantity of auxiliary streams included in the node, and/or a type of an auxiliary stream included in the node, and/or a brief description of an auxiliary stream included in the node.

In an eighth possible implementation manner of the second aspect, with reference to the sixth possible implementation manner of the second aspect or the seventh possible implementation manner of the second aspect, the auxiliary stream resource information includes a node number of the node, and the sending auxiliary stream resource information of the node to the control device such that after determining, according to the auxiliary stream resource information, an auxiliary stream to which a token may be allocated, the control device matches the auxiliary stream to which a token may be allocated with a reserved token and performs management, and allocates, with reference to an allocation policy, the token to the at least one auxiliary stream further includes sending the auxiliary stream resource information of the node to the control device such that after determining, according to the auxiliary stream resource information, the auxiliary stream to which a token may be allocated, the control device matches the auxiliary stream to which a token may be allocated with the reserved token and performs management according to a first rule, and allocates, with reference to the allocation policy, the token to the at least one auxiliary stream, where the first rule is as follows: a token is allocated by node, and auxiliary streams with a same node number are allocated a same token.

In a ninth possible implementation manner of the second aspect, with reference to the sixth possible implementation manner of the second aspect or the seventh possible implementation manner of the second aspect, the auxiliary stream resource information includes an identifier of an auxiliary stream included in the node, and the sending auxiliary stream resource information of the node to the control device such that after determining, according to the auxiliary stream resource information, an auxiliary stream to which a token may be allocated, the control device matches the auxiliary stream to which a token may be allocated with a reserved token and performs management, and allocates, with reference to an allocation policy, the token to the at least one auxiliary stream further includes sending the auxiliary stream resource information of the node to the control device such that after determining, according to the auxiliary stream resource information, the auxiliary stream to which a token may be allocated, the control device matches the auxiliary stream to which a token may be allocated with the reserved token and performs management according to a second rule, and allocates, with reference to the allocation policy, the token to the at least one auxiliary stream, where the second rule is as follows: a token is allocated by auxiliary stream, and auxiliary streams with different auxiliary stream identifiers are allocated different tokens.

In a tenth possible implementation manner of the second aspect, with reference to the sixth possible implementation manner of the second aspect or the seventh possible implementation manner of the second aspect, the auxiliary stream resource information includes a node number of the node, and an identifier of an auxiliary stream included in the node, and the sending auxiliary stream resource information of the node to the control device such that after determining, according to the auxiliary stream resource information, an auxiliary stream to which a token may be allocated, the control device matches the auxiliary stream to which a token may be allocated with a reserved token and performs management, and allocates, with reference to an allocation policy, the token to the at least one auxiliary stream further includes sending the auxiliary stream resource information of the node to the control device such that after determining, according to the auxiliary stream resource information, the auxiliary stream to which a token may be allocated, the control device matches the auxiliary stream to which a token may be allocated with the reserved token and performs management according to a third rule, and allocates, with reference to the allocation policy, the token to the at least one auxiliary stream, where the third rule is as follows: a parent token is allocated by node, and auxiliary streams with a same node number are allocated a same parent token, for auxiliary streams that have a same parent token, a child token is allocated by auxiliary stream, and auxiliary streams with different auxiliary stream identifiers are allocated different child tokens.

According to a third aspect, a control device is provided. The control device includes a determining unit, an allocating unit, and a sending unit, where the determining unit is configured to determine to allocate a token to m auxiliary streams, where the m auxiliary streams belong to n node, $n \geq 1$, $m \geq 2$, and $m \geq n$, the allocating unit is configured to allocate a token to the m auxiliary streams determined by the determining unit, the sending unit is configured to send a token allocated by the allocating unit to an auxiliary stream of a first node to the first node, where the first node is one node of the n node, and the sending unit is further configured to send a first indication message to the first node, where the first indication message is used to instruct the first node to send a first auxiliary stream according to the received token, and the first auxiliary stream includes at least one auxiliary stream of the m auxiliary streams.

In a first possible implementation manner of the third aspect, with reference to the third aspect, the control device further includes a receiving unit and an updating unit, where the receiving unit is configured to, before the determining unit determines to allocate the token to the m auxiliary streams, receive a request message from the n node, where the request message from the n node is used to request to acquire a token required for sending the m auxiliary streams, the determining unit determining to allocate a token to m auxiliary streams further includes searching, according to the request message from the n node, for pre-stored token information, where the token information is information that represents an occupancy status of a token, and determining to allocate the token to the m auxiliary streams when the token information represents that the token required by the m auxiliary streams is not occupied, the allocating unit allocating a token to the m auxiliary streams includes allocating, according to the token information, the token required by the m auxiliary streams to the m auxiliary streams, and the updating unit is configured to update the token information after the allocating unit allocates the token to the m auxiliary streams.

In a second possible implementation manner of the third aspect, with reference to the first possible implementation manner of the third aspect, the token is a first token corresponding to a node, the token information includes a quantity of idle tokens, and a correspondence between a used token and a token-allocated node, the determining unit determining to allocate the token to the m auxiliary streams when the token information represents that the token required by the m auxiliary streams is not occupied further includes when the quantity of idle tokens is not less than n, determining to allocate the token to the m auxiliary streams, and the updating unit updating the token information includes updating, in the token information, the quantity of idle tokens, and information about the correspondence between a used token and a token-allocated node.

In a third possible implementation manner of the third aspect, with reference to the first possible implementation manner of the third aspect, the token is a second token corresponding to an auxiliary stream, the token information includes a quantity of idle tokens, and a correspondence between a used token and a token-allocated auxiliary stream of a node, the determining unit determining to allocate the token to the m auxiliary streams when the token information represents that the token required by the m auxiliary streams is not occupied further includes when the quantity of idle tokens is not less than m, determining to allocate the token to the m auxiliary streams, and the updating unit updating the token information includes updating, in the token information, the quantity of idle tokens, and information about the correspondence between a used token and a token-allocated auxiliary stream of a node.

In a fourth possible implementation manner of the third aspect, with reference to the first possible implementation manner of the third aspect, the token is a child token corresponding to an auxiliary stream, where the child token has a corresponding parent token, and the parent token is a first token corresponding to a node, the token information includes a quantity of idle parent tokens, a quantity of idle child tokens included in each idle parent token, a correspondence between a used parent token and a token-allocated node, a correspondence between the used parent token and a quantity of idle child tokens included in the used parent token, and a correspondence between a used child token included in the used parent token and a token-allocated auxiliary stream, the determining unit determining, to allocate the token to the m auxiliary streams when the token information represents that the token required by the m auxiliary streams is not occupied further includes when a quantity of tokens requested by a second node in the n node is not greater than a quantity of idle child tokens included in a parent token corresponding to the second node, a quantity of third nodes in the n node is not greater than the quantity of idle parent tokens in the token information, and a quantity of tokens requested by each third node is not greater than a quantity of idle child tokens included in a parent token corresponding to the third node, determining to allocate the token to the m auxiliary streams, where the second node is a node to which a used parent token is allocated, and the third node is a node to which no parent token is allocated, and the updating unit updating the token information includes updating, in the token information, the quantity of idle parent tokens, the quantity of idle child tokens included in each idle parent token, the correspondence between a used parent token and a token-allocated node, the correspondence between a used parent token and a quantity of idle child tokens included in the used parent token, and the correspondence between a used child token included in a used parent token and a token-allocated auxiliary stream.

In a fifth possible implementation manner of the third aspect, with reference to the third aspect, the control device further includes a receiving unit and a matching unit, where the receiving unit is configured to, before the determining unit determines to allocate the token to the m auxiliary streams, receive auxiliary stream resource information reported by a controlled node, where the auxiliary stream resource information is information that represents an auxiliary stream included in the controlled node, the determining unit is further configured to determine, according to the auxiliary stream resource information, an auxiliary stream to which a token may be allocated, the matching unit is configured to match a reserved token with the auxiliary stream to which a token may be allocated in order to acquire a correspondence between a token and an auxiliary stream, the determining unit determining to allocate a token to m auxiliary streams further includes determining, according to an allocation policy, to allocate the token to the m auxiliary streams, and the allocating unit allocating a token to the m auxiliary streams includes allocating, according to the correspondence that is between a token and an auxiliary stream and is acquired by the matching unit, the token required by the m auxiliary streams to the m auxiliary streams.

In a sixth possible implementation manner of the third aspect, with reference to the fifth possible implementation manner of the third aspect, the auxiliary stream resource information further includes a quantity of auxiliary streams included in each controlled node, and/or a type of an auxiliary stream included in each controlled node, and/or a brief description of an auxiliary stream included in each controlled node.

In a seventh possible implementation manner of the third aspect, with reference to the fifth possible implementation manner of the third aspect and the sixth possible implementation manner of the third aspect, the auxiliary stream resource information includes a node number corresponding to an auxiliary stream included in each controlled node, and the matching unit matching a reserved token with the auxiliary stream to which a token may be allocated further includes matching, according to a first rule, the reserved token with the auxiliary stream to which a token may be allocated, where the first rule is as follows: a token is allocated by node, and auxiliary streams with a same node number are allocated a same token.

In an eighth possible implementation manner of the third aspect, with reference to the fifth possible implementation manner of the third aspect and the sixth possible implementation manner of the third aspect, the auxiliary stream resource information includes an identifier of an auxiliary stream included in each controlled node, and the matching unit matching a reserved token with the auxiliary stream to which a token may be allocated further includes matching, according to a second rule, the reserved token with the auxiliary stream to which a token may be allocated, where the second rule is as follows: a token is allocated by auxiliary stream, and auxiliary streams with different auxiliary stream identifiers are allocated different tokens.

In a ninth possible implementation manner of the third aspect, with reference to the fifth possible implementation manner of the third aspect and the sixth possible implementation manner of the third aspect, the auxiliary stream resource information includes a node number corresponding to an auxiliary stream included in each controlled node, and an identifier of the auxiliary stream included in each controlled node, and the matching unit matching a reserved token with the auxiliary stream to which a token may be allocated further includes matching, according to a third rule, the reserved token with the auxiliary stream to which a token may be allocated, where the third rule is as follows: a parent token is allocated by node, and auxiliary streams with a same node number are allocated a same parent token, for auxiliary streams that have a same parent token, a child token is allocated by auxiliary stream, and auxiliary streams with different auxiliary stream identifiers are allocated different child tokens.

In a tenth possible implementation manner of the third aspect, with reference to the third aspect to the ninth possible implementation manner of the third aspect, the control device further includes an acquiring unit, where the acquiring unit is configured to, after the sending unit sends the first indication message to the first node, acquire the first auxiliary stream sent by the first node, and the sending unit is further configured to send the first auxiliary stream acquired by the acquiring unit to a fourth node.

In an eleventh possible implementation manner of the third aspect, with reference to the tenth possible implementation manner of the third aspect, the receiving unit is further configured to, before the sending unit sends the first indication message to the first node, receive a first request message sent by the fourth node, where the first request message is used to request to acquire the first auxiliary stream, and the sending unit sending a first indication message to the first node includes sending the first indication message to the first node according to the first request message.

In a twelfth possible implementation manner of the third aspect, with reference to the tenth possible implementation manner of the third aspect, the sending unit sending a first indication message to the first node includes sending the first indication message to the first node according to a control policy.

In a thirteenth possible implementation manner of the third aspect, with reference to the twelfth possible implementation manner of the third aspect, the sending unit is further configured to send a query message before sending the first auxiliary stream to the fourth node, where the query message is used to query whether the fourth node may receive the first auxiliary stream, and the receiving unit is further configured to receive a confirmation message sent by the fourth node, where the confirmation message is used to indicate that the fourth node may receive the first auxiliary stream.

According to a fourth aspect, a node is provided. The node includes an acquiring unit, a determining unit, a receiving unit, and a sending unit, where the acquiring unit is configured to acquire, from a control device, a token required by at least one auxiliary stream, the determining unit is configured to determine a type of the token, the receiving unit is configured to receive a first indication message sent by the control device, where the first indication message is used to instruct the node to send a first auxiliary stream, and the sending unit is configured to send the first auxiliary stream according to the type of the token that is determined by the determining unit when the token required by the at least one auxiliary stream that is acquired by the acquiring unit includes a token required by the first auxiliary stream.

In a first possible implementation manner of the fourth aspect, with reference to the fourth aspect, the sending unit is further configured to, before the acquiring unit acquires, from the control device, the token required by the at least one auxiliary stream, send a request message to the control device, where the request message is used to request to acquire the token required by the at least one auxiliary stream.

In a second possible implementation manner of the fourth aspect, with reference to the first possible implementation manner of the fourth aspect, the type of the token is a first token corresponding to a node and is a token for multiple auxiliary streams, and the sending unit sending the first auxiliary stream according to the determined type of the token when the token required by the at least one auxiliary stream includes a token required by the first auxiliary stream further includes establishing M auxiliary stream channels corresponding to the token required by the first auxiliary stream, where M is a quantity of auxiliary streams included in the first auxiliary stream, and sending the first auxiliary stream through the M auxiliary stream channels.

In a third possible implementation manner of the fourth aspect, with reference to the first possible implementation manner of the fourth aspect, the token is a first token corresponding to a node and is a token for a single auxiliary stream, and the sending unit sending the first auxiliary stream according to the determined type of the token when the token required by the at least one auxiliary stream includes a token required by the first auxiliary stream further includes establishing one auxiliary stream channel corresponding to the token required by the first auxiliary stream, and when a quantity of auxiliary streams included in the first auxiliary stream is at least two, synthesizing the auxiliary streams included in the first auxiliary stream such that the first auxiliary stream becomes one auxiliary stream, and sending the synthesized first auxiliary stream through the established auxiliary stream channel, or when a quantity of auxiliary streams included in the first auxiliary stream is one, sending the first auxiliary stream through the established auxiliary stream channel.

In a fourth possible implementation manner of the fourth aspect, with reference to the first possible implementation manner of the fourth aspect, the token is a second token corresponding to an auxiliary stream, or the token is a child token that is corresponding to an auxiliary stream and has a corresponding parent token, where the parent token is a first token corresponding to a node, and the sending unit sending the first auxiliary stream according to the determined type of the token when the token required by the at least one auxiliary stream includes a token required by the first auxiliary stream further includes establishing M auxiliary stream channels corresponding to the token required by the first auxiliary stream, where M is a quantity of auxiliary streams included in the first auxiliary stream, and sending the first auxiliary stream through the M auxiliary stream channels.

In a fifth possible implementation manner of the fourth aspect, with reference to the fourth possible implementation manner of the fourth aspect, the token is the child token that is corresponding to an auxiliary stream and has a corresponding parent token, and the acquiring unit is further configured to, after the sending unit sends the request message to the control device, and before the token required by the at least one auxiliary stream is acquired from the control device, acquire, from the control device, a parent token of a node corresponding to the at least one auxiliary stream, where the parent token includes at least one idle child token in order to acquire the token required by the at least one auxiliary stream.

In a sixth possible implementation manner of the fourth aspect, with reference to the fourth aspect, the sending unit is further configured to, before the acquiring unit acquires, from the control device, the token required by the at least one auxiliary stream, send auxiliary stream resource information of the node to the control device such that after determining, according to the auxiliary stream resource information, an auxiliary stream to which a token may be allocated, the control device matches the auxiliary stream to which a token may be allocated with a reserved token and performs management, and allocates, with reference to an allocation policy, the token to the at least one auxiliary stream, where the auxiliary stream resource information is information that represents an auxiliary stream included in the node.

In a seventh possible implementation manner of the fourth aspect, with reference to the sixth possible implementation manner of the fourth aspect, the auxiliary stream resource information further includes a quantity of auxiliary streams included in the node, and/or a type of an auxiliary stream included in the node, and/or a brief description of an auxiliary stream included in the node.

In an eighth possible implementation manner of the fourth aspect, with reference to the sixth possible implementation manner of the fourth aspect or the seventh possible implementation manner of the fourth aspect, the auxiliary stream resource information includes a node number of the node, and the sending unit sending auxiliary stream resource information of the node to the control device such that after determining, according to the auxiliary stream resource information, an auxiliary stream to which a token may be allocated, the control device matches the auxiliary stream to which a token may be allocated with a reserved token and performs management, and allocates, with reference to an allocation policy, the token to the at least one auxiliary stream further includes sending the auxiliary stream resource information of the node to the control device such that after determining, according to the auxiliary stream resource information, the auxiliary stream to which a token may be allocated, the control device matches the auxiliary stream to which a token may be allocated with the reserved token and performs management according to a first rule, and allocates, with reference to the allocation policy, the token to the at least one auxiliary stream, where the first rule is as follows: a token is allocated by node, and auxiliary streams with a same node number are allocated a same token.

In a ninth possible implementation manner of the fourth aspect, with reference to the sixth possible implementation manner of the fourth aspect or the seventh possible implementation manner of the fourth aspect, the auxiliary stream resource information includes an identifier of an auxiliary stream included in the node, and the sending unit sending auxiliary stream resource information of the node to the control device such that after determining, according to the auxiliary stream resource information, an auxiliary stream to which a token may be allocated, the control device matches the auxiliary stream to which a token may be allocated with a reserved token and performs management, and allocates, with reference to an allocation policy, the token to the at least one auxiliary stream further includes sending the auxiliary stream resource information of the node to the control device such that after determining, according to the auxiliary stream resource information, the auxiliary stream to which a token may be allocated, the control device matches the auxiliary stream to which a token may be allocated with the reserved token and performs management according to a second rule, and allocates, with reference to the allocation policy, the token to the at least one auxiliary stream, where the second rule is as follows: a token is allocated by auxiliary stream, and auxiliary streams with different auxiliary stream identifiers are allocated different tokens.

In a tenth possible implementation manner of the fourth aspect, with reference to the sixth possible implementation manner of the fourth aspect or the seventh possible implementation manner of the fourth aspect, the auxiliary stream resource information includes a node number of the node, and an identifier of an auxiliary stream included in the node, and the sending unit sending auxiliary stream resource information of the node to the control device such that after determining, according to the auxiliary stream resource information, an auxiliary stream to which a token may be allocated, the control device matches the auxiliary stream to which a token may be allocated with a reserved token and performs management, and allocates, with reference to an allocation policy, the token to the at least one auxiliary stream further includes sending the auxiliary stream resource information of the node to the control device such that after determining, according to the auxiliary stream resource information, the auxiliary stream to which a token may be allocated, the control device matches the auxiliary stream to which a token may be allocated with the reserved token and performs management according to a third rule, and allocates, with reference to the allocation policy, the token to the at least one auxiliary stream, where the third rule is as follows: a parent token is allocated by a node, and auxiliary streams with a same node number are allocated a same parent token, for auxiliary streams that have a same parent token, a child token is allocated by auxiliary stream, and auxiliary streams with different auxiliary stream identifiers are allocated different child tokens.

According to a fifth aspect, a control device is provided. The control device includes a processor and a sender, where the processor is configured to determine to allocate a token to m auxiliary streams, where the m auxiliary streams belong to n node, n≥1, m≥2, and m≥n, the processor is further configured to allocate a token to the m auxiliary streams, the sender is configured to send a token allocated by the processor to an auxiliary stream of a first node to the first node, where the first node is one node of the n node, and the sender is further configured to send a first indication message to the first node, where the first indication message is used to instruct the first node to send a first auxiliary stream according to the received token, and the first auxiliary stream includes at least one auxiliary stream of the m auxiliary streams.

In a first possible implementation manner of the fifth aspect, with reference to the fifth aspect, the control device further includes a receiver, where the receiver is configured to, before the processor determines to allocate the token to the m auxiliary streams, receive a request message from the n node, where the request message from the n node is used to request to acquire a token required for sending the m auxiliary streams, the determining, by the processor, to allocate a token to m auxiliary streams further includes searching, according to the request message from the n node, for pre-stored token information, where the token information is information that represents an occupancy status of a token, and determining to allocate the token to the m auxiliary streams when the token information represents that the token required by the m auxiliary streams is not occupied, the allocating, by the processor, a token to the m auxiliary streams includes allocating, according to the token information, the token required by the m auxiliary streams to the m auxiliary streams, and the processor is further configured to update the token information after allocating the token to the m auxiliary streams.

In a second possible implementation manner of the fifth aspect, with reference to the first possible implementation manner of the fifth aspect, the token is a first token corresponding to a node, the token information includes a quantity of idle tokens, and a correspondence between a used token and a token-allocated node, the determining, by the processor, to allocate the token to the m auxiliary streams when the token information represents that the token required by the m auxiliary streams is not occupied further includes when the quantity of idle tokens is not less than n, determining to allocate the token to the m auxiliary streams, and the updating, by the processor, the token information includes updating, in the token information, the quantity of idle tokens, and information about the correspondence between a used token and a token-allocated node.

In a third possible implementation manner of the fifth aspect, with reference to the first possible implementation manner of the fifth aspect, the token is a second token corresponding to an auxiliary stream, the token information includes a quantity of idle tokens, and a correspondence between a used token and a token-allocated auxiliary stream of a node, the determining, by the processor, to allocate the token to the m auxiliary streams when the token information represents that the token required by the m auxiliary streams is not occupied further includes when the quantity of idle tokens is not less than m, determining to allocate the token to the m auxiliary streams, and the updating, by the processor, the token information includes updating, in the token information, the quantity of idle tokens, and information about the correspondence between a used token and a token-allocated auxiliary stream of a node.

In a fourth possible implementation manner of the fifth aspect, with reference to the first possible implementation manner of the fifth aspect, the token is a child token corresponding to an auxiliary stream, where the child token has a corresponding parent token, and the parent token is a first token corresponding to a node, the token information includes a quantity of idle parent tokens, a quantity of idle child tokens included in each idle parent token, a correspondence between a used parent token and a token-allocated node, a correspondence between the used parent token and a quantity of idle child tokens included in the used parent token, and a correspondence between the used child token included in a used parent token and a token-allocated auxiliary stream, the determining, by the processor, to allocate the token to the m auxiliary streams when the token information represents that the token required by the m auxiliary streams is not occupied further includes when a quantity of tokens requested by a second node in the n node is not greater than a quantity of idle child tokens included in a parent token corresponding to the second node, a quantity of third nodes in the n node is not greater than the quantity of idle parent tokens in the token information, and a quantity of tokens requested by each third node is not greater than a quantity of idle child tokens included in a parent token corresponding to the third node, determining to allocate the token to the m auxiliary streams, where the second node is a node to which a used parent token is allocated, and the third node is a node to which no parent token is allocated, and the updating, by the processor, the token information includes updating, in the token information, the quantity of idle parent tokens, the quantity of idle child tokens included in each idle parent token, the correspondence between a used parent token and a token-allocated node, the correspondence between a used parent token and a quantity of idle child tokens included in the used parent token, and the correspondence between a used child token included in a used parent token and a token-allocated auxiliary stream.

In a fifth possible implementation manner of the fifth aspect, with reference to the fifth aspect, the control device further includes a receiver, where the receiver is configured to, before the processor determines to allocate the token to the m auxiliary streams, receive auxiliary stream resource information reported by a controlled node, where the auxiliary stream resource information is information that represents an auxiliary stream included in the controlled node, the processor is further configured to determine, according to the auxiliary stream resource information, an auxiliary stream to which a token may be allocated, the processor is configured to match a reserved token with the auxiliary stream to which a token may be allocated in order to acquire a correspondence between a token and an auxiliary stream, the determining, by the processor, to allocate a token to m auxiliary streams further includes determining, according to an allocation policy, to allocate the token to the m auxiliary streams, and the allocating, by the processor, a token to the m auxiliary streams includes allocating, according to the acquired correspondence between a token and an auxiliary stream, the token required by the m auxiliary streams to the m auxiliary streams.

In a sixth possible implementation manner of the fifth aspect, with reference to the fifth possible implementation manner of the fifth aspect, the auxiliary stream resource information further includes a quantity of auxiliary streams included in each controlled node, and/or a type of an auxiliary stream included in each controlled node, and/or a brief description of an auxiliary stream included in each controlled node.

In a seventh possible implementation manner of the fifth aspect, with reference to the fifth possible implementation manner of the fifth aspect and the sixth possible implementation manner of the fifth aspect, the auxiliary stream resource information includes a node number corresponding to an auxiliary stream included in each controlled node, and the matching, by the processor, a reserved token with the auxiliary stream to which a token may be allocated further includes matching, according to a first rule, the reserved token with the auxiliary stream to which a token may be allocated, where the first rule is as follows: a token is allocated by node, and auxiliary streams with a same node number are allocated a same token.

In an eighth possible implementation manner of the fifth aspect, with reference to the fifth possible implementation manner of the fifth aspect and the sixth possible implementation manner of the fifth aspect, the auxiliary stream resource information includes an identifier of an auxiliary stream included in each controlled node, and the matching, by the processor, a reserved token with the auxiliary stream to which a token may be allocated further includes matching, according to a second rule, the reserved token with the auxiliary stream to which a token may be allocated, where the second rule is as follows: a token is allocated by auxiliary stream, and auxiliary streams with different auxiliary stream identifiers are allocated different tokens.

In a ninth possible implementation manner of the fifth aspect, with reference to the fifth possible implementation manner of the fifth aspect and the sixth possible implementation manner of the fifth aspect, the auxiliary stream resource information includes a node number corresponding to an auxiliary stream included in each controlled node, and an identifier of the auxiliary stream included in each controlled node, and the matching, by the processor, a reserved token with the auxiliary stream to which a token may be allocated further includes matching, according to a third rule, the reserved token with the auxiliary stream to which a token may be allocated, where the third rule is as follows: a parent token is allocated by node, and auxiliary streams with a same node number are allocated a same parent token, for auxiliary streams that have a same parent token, a child token is allocated by auxiliary stream, and auxiliary streams with different auxiliary stream identifiers are allocated different child tokens.

In a tenth possible implementation manner of the fifth aspect, with reference to the fifth aspect to the ninth possible implementation manner of the fifth aspect, the processor is further configured to, after the sender sends the first indication message to the first node, acquire the first auxiliary stream sent by the first node, and the sender is further configured to send the first auxiliary stream acquired by the processor to a fourth node.

In an eleventh possible implementation manner of the fifth aspect, with reference to the tenth possible implementation manner of the fifth aspect, the receiver is further configured to, before the sender sends the first indication message to the first node, receive a first request message sent by the fourth node, where the first request message is used to request to acquire the first auxiliary stream, and the sending, by the sender, a first indication message to the first node includes sending the first indication message to the first node according to the first request message.

In a twelfth possible implementation manner of the fifth aspect, with reference to the tenth possible implementation manner of the fifth aspect, the sending, by the sender, a first indication message to the first node includes sending the first indication message to the first node according to a control policy.

In a thirteenth possible implementation manner of the fifth aspect, with reference to the twelfth possible implementation manner of the fifth aspect, the sender is further configured to send a query message before sending the first auxiliary stream to the fourth node, where the query message is used to query whether the fourth node may receive the first auxiliary stream, and the receiver is further configured to receive a confirmation message sent by the fourth node, where the confirmation message is used to indicate that the fourth node may receive the first auxiliary stream.

According to a sixth aspect, a node is provided. The node includes a processor, a receiver, and a sender, where the processor is configured to acquire, from a control device, a token required by at least one auxiliary stream, the processor is further configured to determine a type of the token, the receiver is configured to receive a first indication message sent by the control device, where the first indication message is used to instruct the node to send a first auxiliary stream, and the sender is configured to send the first auxiliary stream according to the type of the token that is determined by the processor when the token that is required by the at least one auxiliary stream and is acquired by the processor includes a token required by the first auxiliary stream.

In a first possible implementation manner of the sixth aspect, with reference to the sixth aspect, the sender is further configured to, before the processor acquires, from the control device, the token required by the at least one auxiliary stream, send a request message to the control device, where the request message is used to request to acquire the token required by the at least one auxiliary stream.

In a second possible implementation manner of the sixth aspect, with reference to the first possible implementation manner of the sixth aspect, the type of the token is a first token corresponding to a node and is a token for multiple auxiliary streams, and the sending, by the sender, the first auxiliary stream according to the determined type of the token when the token required by the at least one auxiliary stream includes a token required by the first auxiliary stream further includes establishing M auxiliary stream channels corresponding to the token required by the first auxiliary stream, where M is a quantity of auxiliary streams included in the first auxiliary stream, and sending the first auxiliary stream through the M auxiliary stream channels.

In a third possible implementation manner of the sixth aspect, with reference to the first possible implementation manner of the sixth aspect, the token is a first token corresponding to a node and is a token for a single auxiliary stream, and the sending, by the sender, the first auxiliary stream according to the determined type of the token when the token required by the at least one auxiliary stream includes a token required by the first auxiliary stream further includes establishing one auxiliary stream channel corresponding to the token required by the first auxiliary stream, and when a quantity of auxiliary streams included in the first auxiliary stream is at least two, synthesizing the auxiliary streams included in the first auxiliary stream such that the first auxiliary stream becomes one auxiliary stream, and sending the synthesized first auxiliary stream through the established auxiliary stream channel, or when a quantity of auxiliary streams included in the first auxiliary stream is one, sending the first auxiliary stream through the established auxiliary stream channel.

In a fourth possible implementation manner of the sixth aspect, with reference to the first possible implementation manner of the sixth aspect, the token is a second token corresponding to an auxiliary stream, or the token is a child token that is corresponding to an auxiliary stream and has a corresponding parent token, where the parent token is a first token corresponding to a node, and the sending, by the sender, the first auxiliary stream according to the determined type of the token when the token required by the at least one auxiliary stream includes a token required by the first auxiliary stream further includes establishing M auxiliary stream channels corresponding to the token required by the first auxiliary stream, where M is a quantity of auxiliary streams included in the first auxiliary stream, and sending the first auxiliary stream through the M auxiliary stream channels.

In a fifth possible implementation manner of the sixth aspect, with reference to the fourth possible implementation manner of the sixth aspect, the token is the child token that is corresponding to an auxiliary stream and has a corresponding parent token, and the processor is further configured to, after the sender sends the request message to the control device, and before the token required by the at least one auxiliary stream is acquired from the control device, acquire, from the control device, a parent token of a node corresponding to the at least one auxiliary stream, where the parent token includes at least one idle child token in order to acquire the token required by the at least one auxiliary stream.

In a sixth possible implementation manner of the sixth aspect, with reference to the sixth aspect, the sender is further configured to, before the processor acquires, from the control device, the token required by the at least one auxiliary stream, send auxiliary stream resource information of the node to the control device such that after determining, according to the auxiliary stream resource information, an auxiliary stream to which a token may be allocated, the control device matches the auxiliary stream to which a token may be allocated with a reserved token and performs management, and allocates, with reference to an allocation policy, the token to the at least one auxiliary stream, where the auxiliary stream resource information is information that represents an auxiliary stream included in the node.

In a seventh possible implementation manner of the sixth aspect, with reference to the sixth possible implementation manner of the sixth aspect, the auxiliary stream resource information further includes a quantity of auxiliary streams included in the node, and/or a type of an auxiliary stream included in the node, and/or a brief description of an auxiliary stream included in the node.

In an eighth possible implementation manner of the sixth aspect, with reference to the sixth possible implementation manner of the sixth aspect or the seventh possible implementation manner of the sixth aspect, the auxiliary stream resource information includes a node number of the node, and the sending, by the sender, auxiliary stream resource information of the node to the control device such that after determining, according to the auxiliary stream resource information, an auxiliary stream to which a token may be allocated, the control device matches the auxiliary stream to which a token may be allocated with a reserved token and performs management, and allocates, with reference to an allocation policy, the token to the at least one auxiliary stream further includes sending the auxiliary stream resource information of the node to the control device such that after determining, according to the auxiliary stream resource information, the auxiliary stream to which a token may be allocated, the control device matches the auxiliary stream to which a token may be allocated with the reserved token and performs management according to a first rule, and allocates, with reference to the allocation policy, the token to the at least one auxiliary stream, where the first rule is as follows: a token is allocated by node, and auxiliary streams with a same node number are allocated a same token.

In a ninth possible implementation manner of the sixth aspect, with reference to the sixth possible implementation manner of the sixth aspect or the seventh possible implementation manner of the sixth aspect, the auxiliary stream resource information includes an identifier of an auxiliary stream included in the node, and the sending, by the sender, auxiliary stream resource information of the node to the control device such that after determining, according to the auxiliary stream resource information, an auxiliary stream to which a token may be allocated, the control device matches the auxiliary stream to which a token may be allocated with a reserved token and performs management, and allocates, with reference to an allocation policy, the token to the at least one auxiliary stream further includes sending the auxiliary stream resource information of the node to the control device such that after determining, according to the auxiliary stream resource information, the auxiliary stream to which a token may be allocated, the control device matches the auxiliary stream to which a token may be allocated with the reserved token and performs management according to a second rule, and allocates, with reference to the allocation policy, the token to the at least one auxiliary stream, where the second rule is as follows: a token is allocated by auxiliary stream, and auxiliary streams with different auxiliary stream identifiers are allocated different tokens.

In a tenth possible implementation manner of the sixth aspect, with reference to the sixth possible implementation manner of the sixth aspect or the seventh possible implementation manner of the sixth aspect, the auxiliary stream resource information includes a node number of the node, and an identifier of an auxiliary stream included in the node, and the sending, by the sender, auxiliary stream resource information of the node to the control device such that after determining, according to the auxiliary stream resource information, an auxiliary stream to which a token may be allocated, the control device matches the auxiliary stream to which a token may be allocated with a reserved token and performs management, and allocates, with reference to an allocation policy, the token to the at least one auxiliary stream further includes sending the auxiliary stream resource information of the node to the control device such that after determining, according to the auxiliary stream resource information, the auxiliary stream to which a token may be allocated, the control device matches the auxiliary stream to which a token may be allocated with the reserved token and performs management according to a third rule, and allocates, with reference to the allocation policy, the token to the at least one auxiliary stream, where the third rule is as follows: a parent token is allocated by node, and auxiliary streams with a same node number are allocated a same parent token, for auxiliary streams that have a same parent token, a child token is allocated by auxiliary stream, and auxiliary streams with different auxiliary stream identifiers are allocated different child tokens.

According to a seventh aspect, a system for controlling multiple auxiliary streams is provided. The system includes a control device and a node, where the control device is configured to determine to allocate a token to m auxiliary streams, and allocate a token to the m auxiliary streams, where the m auxiliary streams belong to n node, $n \geq 1$, $m \geq 2$, and $m \geq n$, the control device is further configured to send a token allocated to an auxiliary stream of a first node to the first node, where the first node is one node of the n node, the first node is configured to acquire, from the control device, a token required by at least one auxiliary stream, and determine a type of the token, the control device is further configured to send a first indication message to the first node, where the first indication message is used to instruct the first node to send a first auxiliary stream according to the received token, and the first auxiliary stream includes at least one auxiliary stream of the m auxiliary streams, and the first node is further configured to receive the first indication message sent by the control device, and when the token required by the at least one auxiliary stream includes a token required by the first auxiliary stream, send the first auxiliary stream according to the determined type of the token.

Based on the foregoing description, the embodiments of the present disclosure provide a method and system for controlling multiple auxiliary streams, a control device, and a node. The control device determines to allocate a token to m auxiliary streams, and allocates a token to the m auxiliary streams, where the m auxiliary streams belong to n node, $n \geq 1$, $m \geq 2$, and $m \geq n$, then, the control device sends a token allocated to an auxiliary stream of a first node to the first node, where the first node is one node of the n node such that the first node may obtain the token, then, the control device sends a first indication message to the first node, where the first indication message is used to instruct the first node to send a first auxiliary stream according to the received token such that the first node may send the first auxiliary stream after receiving the first indication message, where the first auxiliary stream includes at least one auxiliary stream of the m auxiliary streams. Ultimately, simultaneously sending auxiliary streams by multiple nodes may be implemented.

BRIEF DESCRIPTION OF DRAWINGS

To describe the technical solutions in the embodiments of the present disclosure or in the prior art more clearly, the following briefly introduces the accompanying drawings required for describing the embodiments or the prior art. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Embodiment 1

Before this embodiment of the present disclosure is described, a specific application scenario of this embodiment of the present disclosure is provided.

Figure 1:
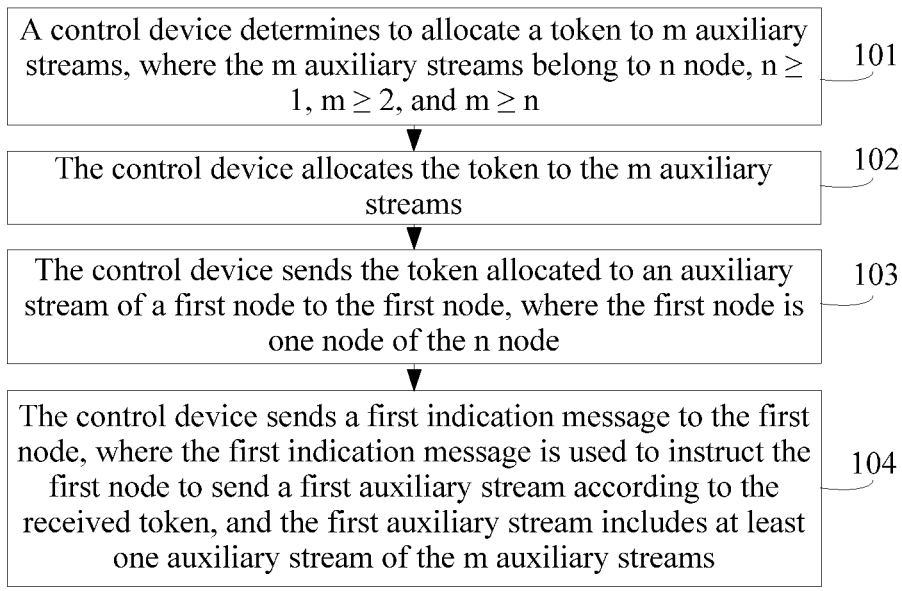
FIG. 1 illustrates a method for controlling multiple auxiliary streams according to an embodiment of the present disclosure.

Currently, participants have increasingly strong demands for multiple auxiliary streams in a remote conference system. A simple scenario is one participant wants to present content on multiple devices of the participant, such as a slide on a computer, a picture in a smartphone, a video clip in a tablet, and a real-time image in a presentation video camera. Another scenario is two participants at different conference sites want to present their respective images simultaneously in order to conduct a comparison analysis or collaborative presentation. In the foregoing scenarios, this embodiment of the present disclosure provides a method for controlling multiple auxiliary streams. As shown in FIG. 1, the method is applied to a control device, and the method includes the following steps:

Step 101. A control device determines to allocate a token to m auxiliary streams, where the m auxiliary streams belong to n node, n≥1, m≥2, and m≥n.

The determining to allocate a token to m auxiliary streams may be performed by the control device according to a delivered allocation policy, or may be performed by the control device after an auxiliary stream request that is sent by a node managed by the control device is received and when a token capability of the control device is satisfied, which is not limited in this embodiment of the present disclosure.

It should be noted that both m and n are merely representation of a quantity, where m is a quantity of auxiliary streams, and n is a quantity of nodes. Considering that a relationship between a node and an auxiliary stream is that a node may include multiple auxiliary streams, the quantity of auxiliary streams is not less than the quantity of nodes, that is, m≥n, where n≥1 is also satisfied so that management on auxiliary streams of multiple nodes may be implemented, and m≥2 is also satisfied so that sending of multiple auxiliary streams of one node may be implemented.

It should be noted that a value of n is an integer greater than or equal to 1, that is, the value of n may be 1, 2, 3, 4 . . . , a value of m is an integer greater than or equal to n, and for example, when n=2, the value of m may be 2, 3, 4 . . . . Exemplarily, when m=3 and n=2, the control device determines to allocate a token to three auxiliary streams, where the three auxiliary streams belong to two nodes.

It should be noted that the node in this embodiment of the present disclosure may be a conference terminal at each conference site, a media gateway, or a conference application server, which is not limited in this embodiment of the present disclosure, one node may include multiple conference terminals, which is also not limited in this embodiment of the present disclosure either.

Step 102. The control device allocates the token to the m auxiliary streams.

After the control device determines to allocate a token to the m auxiliary streams, the control device may allocate the token to the m auxiliary streams.

Step 103. The control device sends the token allocated to an auxiliary stream of a first node to the first node, where the first node is one node of the n node.

After the control device allocates the token to the m auxiliary streams, the control device sends the token allocated to an auxiliary stream of the first node to the first node such that the first node may obtain the token, and then, when an auxiliary stream needs to be sent, determine, according to the token, whether the auxiliary stream may be sent.

It should be noted that the first node is one node of the n node, and in this embodiment of the present disclosure, one first node may be included, or multiple first nodes may be included, which is not limited in this embodiment of the present disclosure.

Step 104. The control device sends a first indication message to the first node, where the first indication message is used to instruct the first node to send a first auxiliary stream according to the received token, and the first auxiliary stream includes at least one auxiliary stream of the m auxiliary streams.

After sending the token allocated to an auxiliary stream of the first node to the first node, the control device further sends the first indication message to the first node, where the first indication message may be triggered by the control device after the control device receives a request message that is sent by a fourth node to request to acquire the first auxiliary stream, or may be triggered by the control device according to a control policy, which is not limited in this embodiment of the present disclosure.

It should be noted that, in this embodiment of the present disclosure, the first indication message may be sent to one first node, or the first indication message may be sent to multiple first nodes, which is not limited in this embodiment of the present disclosure. It is limited only to that the first node is one node of the n node. In addition, the first auxiliary stream may include one auxiliary stream, or may include multiple auxiliary streams, which is also not limited in this embodiment of the present disclosure.

It should be noted that, in this embodiment of the present disclosure, "first" in "the first node" and "fourth" in "the fourth node" do not have any special meaning, and are merely used to differentiate nodes.

Based on the foregoing description of this embodiment of the present disclosure, a control device determines to allocate a token to m auxiliary streams, and allocates a token to the m auxiliary streams, where the m auxiliary streams belong to n node, n≥1, m≥2, and m≥n, then, the control device sends a token allocated to an auxiliary stream of a first node to the first node, where the first node is one node of the n node such that the first node may obtain the token, then, the control device sends a first indication message to the first node, where the first indication message is used to instruct the first node to send a first auxiliary stream according to the received token such that the first node may send the first auxiliary stream after receiving the first indication message, where the first auxiliary stream includes at least one auxiliary stream of the m auxiliary streams. Ultimately, simultaneously sending auxiliary streams by multiple nodes may be implemented.

Figure 2:
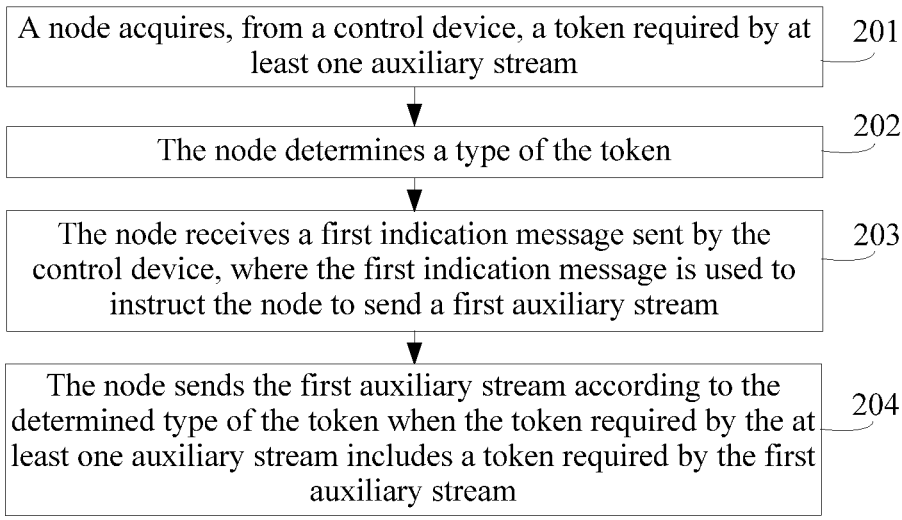
FIG. 2 illustrates another method for controlling multiple auxiliary streams according to an embodiment of the present disclosure.

An embodiment of the present disclosure further provides a method for controlling multiple auxiliary streams. As shown in FIG. 2, the method is applied to a node, and the method includes the following steps:

Step 201. A node acquires, from a control device, a token required by at least one auxiliary stream.

The token required by the at least one auxiliary stream is allocated by the control device, the allocating may be performed by the control device according to a delivered allocation policy, or may be performed by the control device, after an auxiliary stream request that is sent by a node managed by the control device is received and when a token capability of the control device is satisfied, which is not limited in this embodiment of the present disclosure. It is described only that the node acquires, from the control device, the token required by the at least one auxiliary stream.

It should be noted that the node in this embodiment of the present disclosure may be a conference terminal at each conference site, may be a media gateway, or may be a conference application server, which is not limited in this embodiment of the present disclosure, one node may include multiple conference terminals, which is also not limited in this embodiment of the present disclosure either.

Step 202. The node determines a type of the token.

Tokens may be defined in multiple manners, and different control devices may manage different types of tokens. Therefore, after acquiring, from the control device, the token required by the at least one auxiliary stream channel, the node first needs to determine the type of the token.

The type of the token may include a first token corresponding to a node, a second token corresponding to an auxiliary stream, or a child token that is corresponding to an auxiliary stream and has a corresponding parent token, where the parent token is a first token corresponding to a node.

It should be noted that the first token is a token corresponding to a node, after a node acquires the first token, the node is capable of sending all auxiliary streams included in the node, but which auxiliary streams need to be sent needs to be determined according to an indication message received by the node, which is not limited in this embodiment of the present disclosure. The first token may be of two types, that is, a token for a single auxiliary stream and a token for multiple auxiliary streams. When the first token is the token for a single auxiliary stream, when multiple auxiliary streams need to be sent, the multiple auxiliary streams need to be synthesized and then sent as one auxiliary stream, when the first token is the token for multiple auxiliary streams, multiple auxiliary stream channels may be established for sending multiple auxiliary streams, where the synthesis includes image processing operations such as combination, splicing, and Picture in Picture.

The second token is a token corresponding to an auxiliary stream. When the token that is acquired by the node and corresponding to the at least one auxiliary stream belongs to the second token, a quantity of tokens acquired by the node is the same as a quantity of auxiliary streams that may be sent by the node. Likewise, which auxiliary streams need to be sent by the node needs to be determined according to an indication message received by the node, which is not limited in this embodiment of the present disclosure.

The child token is a token that is corresponding to an auxiliary stream and has a corresponding parent token, where the parent token is one type of the foregoing first token and is corresponding to a node, the child token is one type of the foregoing second token and is corresponding to an auxiliary stream. When the token that is acquired by the node and required by the at least one auxiliary stream belongs to the child token, a quantity of tokens acquired by the node is the same as a quantity of auxiliary streams that the node is allowed to send. Likewise, which auxiliary streams need to be sent by the node needs to be determined according to an indication message received by the node, which is not limited in this embodiment of the present disclosure.

It should be noted that the foregoing child node and parent node are bound to each other. That is, for an auxiliary stream, a parent token is allocated to a node to which the auxiliary stream belongs, and a child token is allocated to the auxiliary stream. In this case, the node may send the auxiliary stream after receiving an indication message for sending the auxiliary stream, otherwise, the auxiliary stream cannot be sent.

Exemplarily, node 1 includes three auxiliary streams, which are auxiliary stream A, auxiliary stream B, and auxiliary stream C respectively. When the control device allocates parent token s to node 1, allocates child token a to auxiliary stream A, allocates child token b to auxiliary stream B, and allocates no token to auxiliary stream C, and when an indication message for sending auxiliary stream A, auxiliary stream B, and auxiliary stream C is received, node 1 sends only auxiliary stream A and auxiliary stream B.

Certainly, a type of a token may be defined in another manner. This embodiment of the present disclosure provides only several exemplary types of tokens, but does not limit the type of the token.

Step 203. The node receives a first indication message sent by the control device, where the first indication message is used to instruct the node to send a first auxiliary stream.

After receiving, from the control device, the token required by the at least one auxiliary stream, the node does not send the at least one auxiliary stream until receiving the first indication message sent by the control device, and determining, according to the first indication message, the first auxiliary stream that needs to be sent.

It should be noted that the first auxiliary stream may be one auxiliary stream, or may be multiple auxiliary streams, which is not limited in this embodiment of the present disclosure.

It should be noted that the first indication message may be sent by the control device, may be triggered by a user of a receiving party, or may be triggered by a user of a sending party.

Exemplarily, when a user of a receiving party wants to receive auxiliary stream 1 and auxiliary stream 2, the user of the receiving party may trigger a control related to auxiliary stream 1 and auxiliary stream 2, after detecting the operation performed by the user of the receiving party, the control device may send a first indication message to a node on which a sending party of auxiliary stream 1 and auxiliary stream 2 resides such that the node determines, according to the first indication message, that first auxiliary streams that need to be sent are auxiliary stream 1 and auxiliary stream 2.

Alternatively, when a user of a sending party wants to send auxiliary stream 1 and auxiliary stream 2, the user of the sending party may trigger a control related to auxiliary stream 1 and auxiliary stream 2, after detecting the operation performed by the user of the sending party, a control device may determine, according to a specific mechanism, to receive only auxiliary stream 2. In this case, the control device delivers a first indication message to a node on which the user of the sending party resides such that the node determines, according to the first indication message, that a first auxiliary stream that needs to be sent is auxiliary stream 2. Certainly, in this process, the "specific mechanism" may be a rule of "applied first", that is, an auxiliary stream that is first triggered is determined as an auxiliary stream that needs to be sent, or may be a rule of "importance", that is, when two auxiliary streams are triggered simultaneously at a moment, the more important auxiliary stream is preferentially selected and determined as an auxiliary stream that needs to be sent. Certainly, another possibility may exist, which is not limited in this embodiment of the present disclosure.

Step 204. The node sends the first auxiliary stream according to the determined type of the token when the token required by the at least one auxiliary stream includes a token required by the first auxiliary stream.

The sending the first auxiliary stream according to the determined type of the token when the token required by the at least one auxiliary stream includes a token required by the first auxiliary stream may include when the token is a token that is for multiple auxiliary streams and is corresponding to a node, establishing M auxiliary stream channels corresponding to the token required by the first auxiliary stream, where M is a quantity of auxiliary streams included in the first auxiliary stream, and sending the first auxiliary stream through the M auxiliary stream channels, or when the token is a token that is for a single auxiliary stream and is corresponding to a node, establishing one auxiliary stream channel corresponding to the token required by the first auxiliary stream, and when a quantity of auxiliary streams included in the first auxiliary stream is at least two, synthesizing the auxiliary streams included in the first auxiliary stream such that after the first auxiliary stream becomes one auxiliary stream, the synthesized auxiliary stream is sent through the established auxiliary stream channel, or when a quantity of auxiliary streams included in the first auxiliary stream is one, sending the first auxiliary stream directly through the established auxiliary stream channel, Or when the token is a second token or a child token, establishing M auxiliary stream channels corresponding to the token required by the first auxiliary stream, where M is a quantity of auxiliary streams included in the first auxiliary stream, and sending the first auxiliary stream through the M auxiliary stream channels.

It should be noted that when the token required by the at least one auxiliary stream does not include the token required by the first auxiliary stream, the node should re-apply or wait for the token required by the first auxiliary stream according to a specific policy, which is not discussed in this embodiment of the present disclosure.

It should be noted that, compared with a method for sending multiple auxiliary streams by using a PREAnnex channel in the prior art, in the method for controlling multiple auxiliary streams that is provided in this embodiment of the present disclosure, a node may send multiple auxiliary streams through different auxiliary stream channels such that auxiliary streams may be differentiated at a remote end according to the auxiliary stream channels, which achieves better user control.

Based on the foregoing description of this embodiment of the present disclosure, a node acquires, from a control device, a token required by at least one auxiliary stream, determines a type of the token, and receives a first indication message sent by the control device, where the first indication message is used to instruct the node to send a first auxiliary stream, and then, when the token required by the at least one auxiliary stream includes a token required by the first auxiliary stream, the node sends the first auxiliary stream according to the determined type of the token. In this way, when the control device controls different nodes to simultaneously send auxiliary streams, sending, by the nodes, the auxiliary streams to the control device may be implemented.

Embodiment 2

Figure 3A:
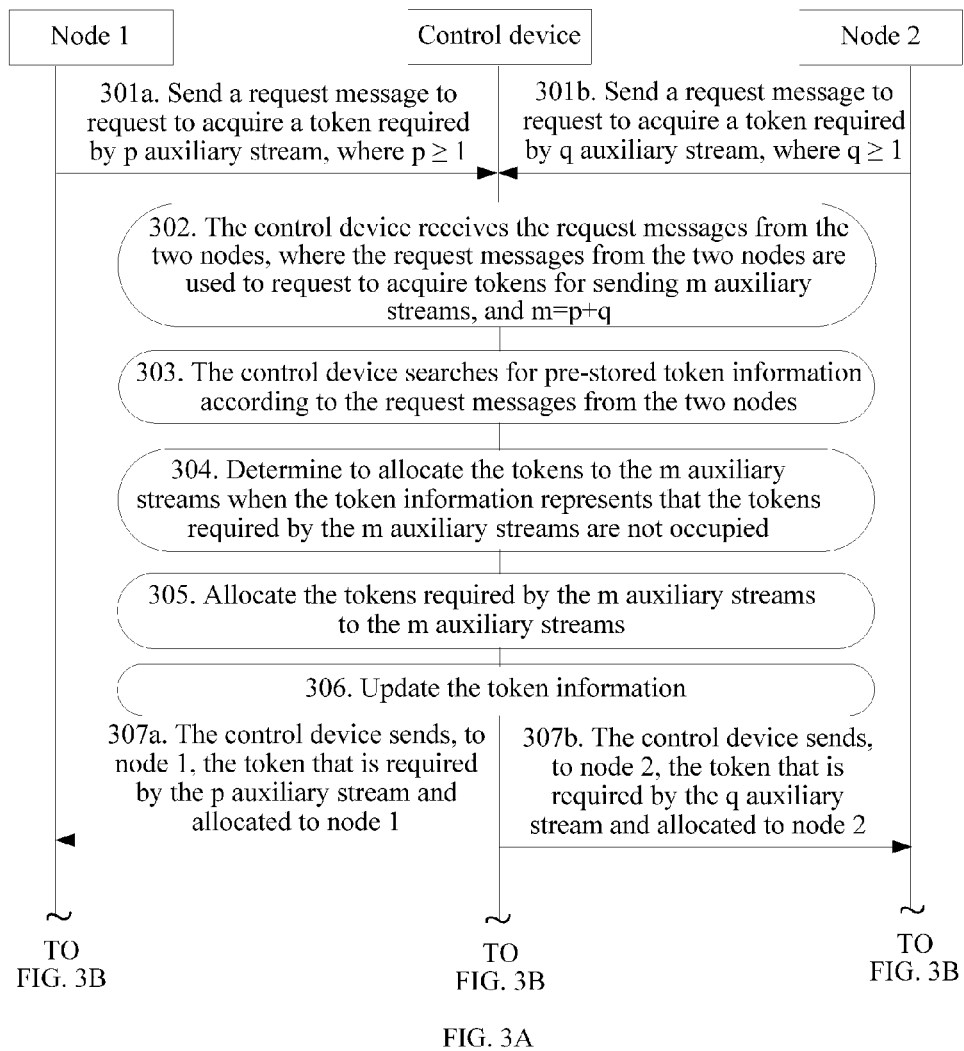
FIG. 3A and FIG. 3B illustrate still another method for controlling multiple auxiliary streams according to an embodiment of the present disclosure.
Figure 3B:
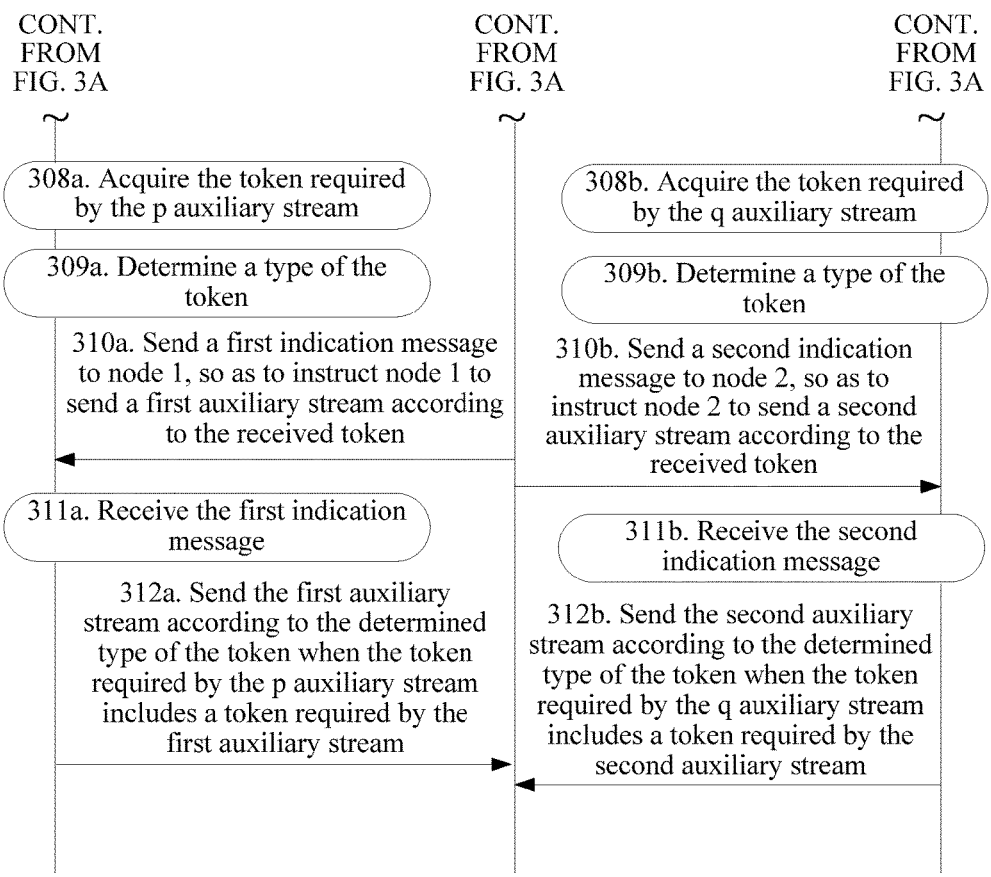

An embodiment of the present disclosure provides a method for controlling multiple auxiliary streams. This method is described by using an interaction between two nodes (node 1 and node 2) and a control device, that is, n=2, where the nodes in this method actively apply for a token. As shown in FIG. 3A and FIG. 3B, the method includes the following steps:

Step 301*a*. Node 1 sends a request message to request to acquire a token required by p auxiliary stream, where p≥1.

Step 301*b*. Node 2 sends a request message to request to acquire a token required by q auxiliary stream, where q≥1.

It should be noted that there is no absolute order for 301*a* and step 301*b*, and the request messages may be sent simultaneously, or the request messages may be sent one by one, which is not limited in this embodiment of the present disclosure. It is only described that corresponding tokens are requested for p+q auxiliary streams of two nodes.

Step 302. A control device receives the request messages from the two nodes, where the request messages from the two nodes are used to request to acquire tokens for sending m auxiliary streams, and m=p+q.

Furthermore, m=p+q, and the request messages from the two nodes are used to request to acquire the tokens corresponding to the m auxiliary streams.

As described above, because an order in which the node 1 and node 2 send the request messages is not limited, an order in which the control device receives the request messages from the two nodes is not limited either. It is only described that the control device receives the request messages of the two nodes. The request messages are used to request to acquire the tokens corresponding to the p+q auxiliary streams.

Step 303. The control device searches for pre-stored token information according to the request messages from the two nodes, where the token information is information that represents an occupancy status of a token.

A type of a token may include a first token corresponding to a node, a second token corresponding to an auxiliary stream, or a child token corresponding to an auxiliary stream and has a corresponding parent token.

The first token may further be classified into a token for multiple auxiliary streams and a token for a single auxiliary stream. The token for multiple auxiliary streams may be used to send multiple auxiliary streams, and the token for a single auxiliary stream may be used to send one auxiliary stream that is obtained by performing image processing such as combination, splicing, and picture-in-picture on some or all of multiple auxiliary streams.

A type of a token managed by the control device determines the pre-stored token information. The following separately describes three cases:

Case 1: A type of the tokens required for sending the m auxiliary streams is a token corresponding to a node, that is, a first token.

The token information of the first token may include a quantity of idle tokens, and a correspondence between a used token and a token-allocated node.

It should be noted that the quantity of idle tokens is a non-negative integer in any case, and each token corresponds to a different node. When the quantity of idle tokens is 0, it indicates that an auxiliary stream of a new node is not allowed to send.

For example 1, as shown in Table 1, token information of the first token shown in Table 1 is as follows: a quantity of idle tokens is four, token 1 is already allocated to node 3, and token 2 is already allocated to node 4.

TABLE 1

| Quantity of idle tokens 4 | |
|---|---|
| Used token | Allocated node |
| Token 1 | Node 3 |
| Token 2 | Node 4 |

Case 2: A type of the tokens required for sending the m auxiliary streams is a token corresponding to an auxiliary stream, that is, a second token.

The token information of the second token includes a quantity of idle tokens, and a correspondence between a used token and a token-allocated auxiliary stream of a node.

It should be noted that the quantity of idle tokens is a non-negative integer in any case, and each token corresponds to a different auxiliary stream. When the quantity of idle tokens is 0, it indicates that a new auxiliary stream is not allowed to send.

For example 2, as shown in Table 2, token information of the second token shown in Table 2 is as follows: a quantity of idle tokens is six, token 1 is already allocated to auxiliary stream t1 of node 1, token 2 is already allocated to auxiliary stream t2 of node 1, and token 3 is already allocated to auxiliary stream t3 of node 3.

TABLE 2

| Quantity of idle tokens 6 | |
|---|---|
| Used token | Auxiliary stream of a token-allocated node |
| Token 1 | Node 1, auxiliary stream t1 |
| Token 2 | Node 1, auxiliary stream t2 |
| Token 3 | Node 2, auxiliary stream t3 |

Case 3: A type of the tokens required for sending the m auxiliary streams is a child token that is corresponding to an auxiliary stream and has a corresponding parent token, where the parent token is a first token corresponding to a node.

The token information of the child token includes a quantity of idle parent tokens, a quantity of idle child tokens included in each idle parent token, a correspondence between a used parent token and a token-allocated node, a correspondence between the used parent token and a quantity of idle child tokens included in the used parent token, and a correspondence between a used child token included in the used parent token and a token-allocated auxiliary stream.

It should be noted that the quantity of idle parent tokens, the quantity of idle child tokens included in each idle parent token, and the quantity of idle child tokens included in the used parent token are non-negative integers in any case, each parent token corresponds to a different node, and each child token correspond to a different auxiliary stream.

A parent token in case 3 is corresponding to a first token in case 1, and a child token is corresponding to an auxiliary stream in a node that has the parent token. For example 3, as shown in Table 3, token information of the child token shown in Table 3 is as follows: a quantity of idle parent tokens is two, a quantity of idle child tokens included in each parent token is 4, parent token 1 is already allocated to node 1, a quantity of idle child tokens included in parent token 1 is three, and used child token 1 included in parent token 1 is already allocated to auxiliary stream t1, parent token 2 is already allocated to node 3, a quantity of idle child tokens included in parent token 2 is two, used child token 1 included in parent token 2 is already allocated to auxiliary stream t2, and used child token 2 included in parent token 2 is already allocated to auxiliary stream t3.

TABLE 3

| Used parent token | Token-allocated node | Quantity of idle child tokens | Used child token | One token-allocated auxiliary stream |
|---|---|---|---|---|
| Parent token 1 | Node 1 | 3 | Child token 1 | Auxiliary stream t1 |
| Parent token 2 | Node 3 | 2 | Child token 1 | Auxiliary stream t2 |
| | | | Child token 2 | Auxiliary stream t3 |
| Quantity of idle parent tokens | | 2 | | |
| Quantity of idle child tokens included in each idle parent token | | 4 | | |

Step 304. The control device determines to allocate the tokens to the m auxiliary streams when the token information represents that the tokens required by the m auxiliary streams are not occupied.

In the m auxiliary streams, p auxiliary stream belongs to node 1, and q auxiliary stream belongs to node 2. Therefore, the determining to allocate the tokens to the m auxiliary streams is specifically determining to allocate the token required by p auxiliary stream to node 1 and allocate the token required by q auxiliary stream to node 2.

Furthermore, following the description in step 303, for the first token described in case 1, the determining, by the control device, to allocate the tokens to the m auxiliary streams when the token information represents that the tokens required by the m auxiliary streams are not occupied further includes when the quantity of idle tokens is not less than n, determining to allocate the tokens to the m auxiliary streams.

Exemplarily, following example 1 described in step 303, referring to the token information of the first token shown in Table 1, the quantity of idle tokens is four, but n=2 in this embodiment of the present disclosure. Because four is obviously not less than two, it is determined that the tokens are allocated to the m auxiliary streams.

Furthermore, following the description in step 303, for the second token described in case 2, the determining, by the control device, to allocate the tokens to the m auxiliary streams when the token information represents that the tokens required by the m auxiliary streams are not occupied further includes when the quantity of idle tokens is not less than m, determining to allocate the tokens to the m auxiliary streams.

Exemplarily, following example 2 described in step 303, referring to the token information of the second token shown in Table 2, the quantity of idle tokens is six, when p=2 and q=1 in this embodiment of the present disclosure, m=p+q=3. Because six is obviously not less than three, it is determined that the tokens are allocated to the three auxiliary streams.

Furthermore, following the description in step 303, for the child token described in case 3, the determining, by the control device, to allocate the tokens to the m auxiliary streams when the token information represents that the tokens required by the m auxiliary streams are not occupied further includes when a quantity of tokens requested by a second node in the n node is not greater than a quantity of idle child tokens included in a parent token corresponding to the second node, a quantity of third nodes in the n node is not greater than the quantity of idle parent tokens in the token information, and a quantity of tokens requested by each third node is not greater than a quantity of idle child tokens included in a parent token corresponding to the third node, determining to allocate the tokens to the m auxiliary streams, where the second node is a node to which a used parent token is allocated, and the third node is a node to which no parent token is allocated.

Exemplarily, following example 3 described in step 303, according to the token information shown in Table 3, it may be learned that node 1 belongs to a second node, and node 2 belongs to a third node, where the quantity of idle parent tokens is two, the quantity of idle child tokens included in node 1 is three, and the quantity of idle child tokens included in node 2 is four. When p=2 and q=1, m=p+q=3. Because the quantity, which is two, of tokens requested for the auxiliary streams of node 1 is not greater than the quantity, which is three, of idle child tokens included in parent token 1, the quantity, which is one, of second nodes is not greater than the quantity, which is two, of idle parent tokens, and the quantity, which is one, of tokens requested by node 2 is not greater than the quantity, which is four, of idle child tokens included in parent token 2, it is determined that the tokens are allocated to the three auxiliary streams.

It should be noted that the third node and a fourth node are nodes that differ from the first node or the second node in the foregoing embodiment in terms of description, and have no special meaning. The first node may include the third node, or may include the fourth node, and the second node may include the third node, or may include the fourth node, which is not limited in this embodiment of the present disclosure.

Step 305. The control device allocates the tokens required by the m auxiliary streams to the m auxiliary streams.

Furthermore, following example 1 in step 304, because the type of the tokens required for sending the m auxiliary streams is the first token corresponding to a node, the allocating the tokens to the m auxiliary streams is specifically allocating the tokens to the n nodes. That is, when p=2, q=1, and m=p+q=3, the allocating, by the control device, the tokens to the three auxiliary streams is specifically allocating one first token to the two auxiliary streams of node 1, and allocating another first token to the one auxiliary stream of node 2.

Furthermore, following example 2 in step 304, because the type of the tokens required for sending the m auxiliary streams is the second token corresponding to an auxiliary stream, when p=2, q=1, and m=p+q=3, the allocating, by the control device, the tokens to the three auxiliary streams is specifically respectively allocating two of the second tokens to the two auxiliary streams of node 1, and allocating another one of the second tokens to the one auxiliary stream of node 2.

Furthermore, following example 3 in step 304, because the type of the tokens required for sending the m auxiliary streams is the child token that is corresponding to an auxiliary stream and has a corresponding parent token, the allocating the tokens to the m auxiliary streams is specifically after allocating a parent token to the third node, allocating child tokens to the m auxiliary streams. That is, when p=2, q=1, and m=p+q=3, the allocating, by the control device, the tokens to the three auxiliary streams is specifically allocating one parent token to node 2, allocating two child tokens to the two auxiliary streams of node 1, and allocating one child token to the one auxiliary stream of node 2.

Step 306. The control device updates the token information.

Furthermore, for the first token described in case 1, the updating the token information includes updating, in the token information, the quantity of idle tokens, and information about the correspondence between a used token and a token-allocated node.

Exemplarily, following example 1 described in step 305, the token information shown in Table 1 is updated to that shown in Table 4.

TABLE 4

| Quantity of idle tokens 2 | |
|---|---|
| Used token | Token-allocated node |
| Token 1 | Node 3 |
| Token 2 | Node 4 |
| Token 3 | Node 1 |
| Token 4 | Node 2 |

Furthermore, for the second token described in case 2, the updating the token information includes updating, in the token information of the second token, the quantity of idle tokens, and information about the correspondence between a used token and a token-allocated auxiliary stream of a node.

Exemplarily, following example 2 described in step 305, the token information of the second token shown in Table 2 is updated to that shown in Table 5.

TABLE 5

| | Quantity of idle tokens 3 |
|---|---|
| Used token | One token-allocated auxiliary stream of a node |
| Token 1 | Node 1, auxiliary stream t1 |
| Token 2 | Node 1, auxiliary stream t2 |
| Token 3 | Node 2, auxiliary stream t3 |
| Token 4 | Node 1, auxiliary stream t4 |
| Token 5 | Node 1, auxiliary stream t5 |
| Token 6 | Node 2, auxiliary stream t6 |

Furthermore, for the child token described in case 3, the updating the token information includes updating, in the token information of the child token, the quantity of idle parent tokens, the quantity of idle child tokens included in each idle parent token, the correspondence between a used parent token and a token-allocated node, the correspondence between the used parent token and a quantity of idle child tokens included in the used parent token, and the correspondence between a used child token included in the used parent token and a token-allocated auxiliary stream.

Exemplarily, following example 3 described in step 305, the token information shown in Table 3 is updated to that shown in Table 6.

TABLE 6

| Used parent token | Token-allocated node | Quantity of idle child tokens | Used child token | One token-allocated auxiliary stream |
|---|---|---|---|---|
| Parent token 1 | Node 1 | 1 | Child token 1 | Auxiliary stream t1 |
| | | | Child token 2 | Auxiliary stream t4 |
| | | | Child token 3 | Auxiliary stream t5 |
| Parent token 2 | Node 3 | 2 | Child token 1 | Auxiliary stream t2 |
| | | | Child token 2 | Auxiliary stream t3 |
| Parent token 3 | Node 2 | 3 | Child token 1 | Auxiliary stream t6 |
| Quantity of idle parent tokens | | | | 1 |
| Quantity of idle child tokens included in each idle parent token | | | | 4 |

It should be noted that the token information provided in the foregoing example 1, example 2, or example 3 is presented in the form of a table, but the token information may be stored in another form in the control device, for example, in a text format, which is not limited in this embodiment of the present disclosure.

In addition, besides token allocation to an auxiliary stream, when a node does not send an auxiliary stream any more, the node may return the token to the control device, or the control device may forcibly withdraw the token from the node. This embodiment of the present disclosure does not elaborate on a case in which a token is withdrawn, and correspondingly, does not elaborate on a case in which token information is updated when a token is withdrawn, either.

Step 307a. The control device sends, to node 1, the token that is required by the p auxiliary stream and allocated to node 1.

Step 308a. Node 1 acquires the token required by the p auxiliary stream.

When p=2, node 1 acquires a token required by two auxiliary streams.

It should be noted that because a token has multiple forms, the token that is acquired by node 1 and is corresponding to the two auxiliary streams may be one token, or may be two tokens, which is determined according to a type of the token and is not limited in this embodiment of the present disclosure.

When the node acquires multiple tokens, the node may receive the multiple tokens simultaneously, or may receive the multiple tokens one by one, and the multiple tokens may be received in a random order, which is not limited in this embodiment of the present disclosure.

Step 309a. Node 1 determines a type of the token.

The type of the token may include a first token corresponding to a node, a second token corresponding to an auxiliary stream, or a child token that is corresponding to an auxiliary stream and has a corresponding parent token, where the parent token is a token corresponding to a node.

The first token may further be classified into a token for multiple auxiliary streams and a token for a single auxiliary stream. The token for multiple auxiliary streams may be used to send multiple auxiliary streams, and the token for a single auxiliary stream may be used to send one auxiliary stream that is obtained by performing image processing such as combination, splicing, and Picture in Picture on some or all of multiple auxiliary streams.

The determining a type of the token may further include determining the type of the token according to an identifier carried in the token, or determining the type of the token by sending a confirmation message to the control device, which is not further limited in this embodiment of the present disclosure.

Step 310a. The control device sends a first indication message to node 1, where the first indication message is used to instruct the node 1 to send a first auxiliary stream according to the received token.

After the control device sends, to node 1, the token that is required by the p auxiliary stream and is allocated to node 1, the control device further sends the first indication message to the first node, where the first indication message may be triggered after the control device receives a request message that is sent by another node to request to acquire the first auxiliary stream, or may be triggered by the control device according to a control policy, which is not limited in this embodiment of the present disclosure.

Step 311a. Node 1 receives the first indication message.

After receiving the token required by the p auxiliary stream, node 1 does not necessarily send the p auxiliary stream. Instead, node 1 first determines, according to the first indication message, the first auxiliary stream that needs to be sent. The first auxiliary stream may be one auxiliary stream, or may be multiple auxiliary streams, which is not limited in this embodiment of the present disclosure and reference may be made to the description in step 203 in Embodiment 1, and which is determined only according to the first indication message.

Step 312a. Send the first auxiliary stream according to the determined type of the token when the token required by the p auxiliary stream includes a token required by the first auxiliary stream.

The sending the first auxiliary stream according to the determined type of the token when the token required by the p auxiliary stream includes a token required by the first auxiliary stream may include when the token is a token that is for multiple auxiliary streams and is corresponding to a node, establishing M auxiliary stream channels corresponding to the token required by the first auxiliary stream, where M is a quantity of auxiliary streams included in the first auxiliary stream, and sending the first auxiliary stream through the M auxiliary stream channels, or when the token is a token that is for a single auxiliary stream and is corresponding to a node, establishing one auxiliary stream channel corresponding to the token required by the first auxiliary stream, and when a quantity of auxiliary streams included in the first auxiliary stream is at least two, synthesizing the auxiliary streams included in the first auxiliary stream such that after the first auxiliary stream becomes one auxiliary stream, the synthesized auxiliary stream is sent through the established auxiliary stream channel, or when a quantity of auxiliary streams included in the first auxiliary stream is one, sending the first auxiliary stream directly through the established auxiliary stream channel, or when the token is a second token or a child token, establishing M auxiliary stream channels corresponding to the token required by the first auxiliary stream, where M is a quantity of auxiliary streams included in the first auxiliary stream, and sending the first auxiliary stream through the M auxiliary stream channels.

It should be noted that when the token required by the p auxiliary stream does not include the token required by the first auxiliary stream, the node should re-apply or wait for the token required by the first auxiliary stream according to a specific policy, which is not discussed in this embodiment of the present disclosure.

Step 307b. The control device sends, to node 2, the token that is required by the q auxiliary stream and allocated to node 2.

Step 308b. Node 2 acquires the token required by the q auxiliary stream.

Step 309b. Node 2 determines a type of the token.

Step 310b. The control device sends a second indication message to node 2, where the second indication message is used to instruct the node 2 to send a second auxiliary stream according to the received token.

It should be noted that, in this embodiment of the present disclosure, "second" in the "second indication message" and the "second auxiliary stream" does not have any special meaning, and is merely used for differentiation from the first indication message and the first auxiliary stream that are received by node 1. In essence, either the first indication message or the second indication message is an indication message sent by the control device to a node to instruct the node to send an auxiliary stream according to a received token.

Step 311b. Node 2 receives the second indication message.

Step 312b. Send the second auxiliary stream according to the determined type of the token when the token required by the q auxiliary stream includes a token required by the second auxiliary stream.

Furthermore, for actions performed by node 2 in steps 307b to 312b, reference may be made to the actions performed by node 1 in steps 307a to 312a, which are not described again in this embodiment of the present disclosure.

Figure 4A:
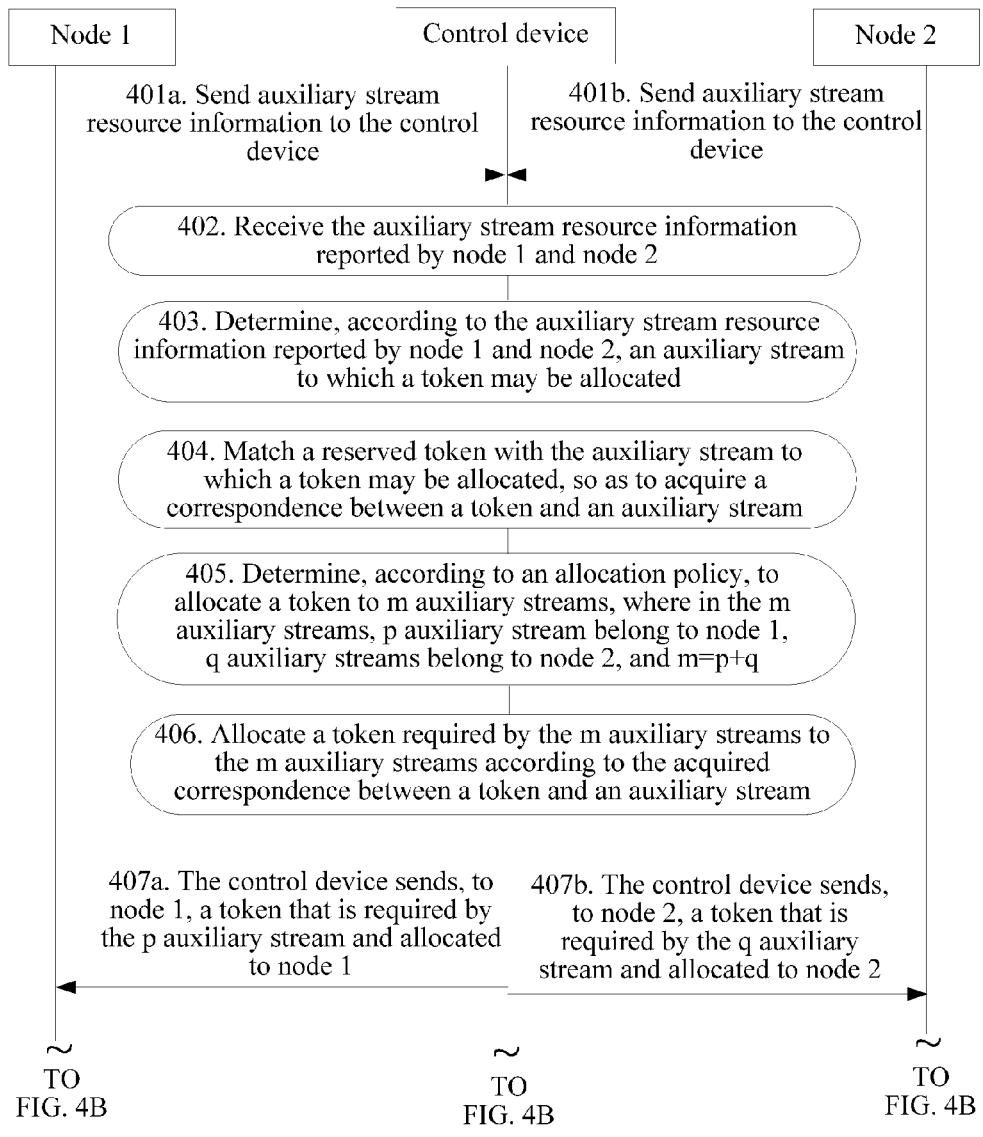
FIG. 4A and FIG. 4B illustrate still another method for controlling multiple auxiliary streams according to an embodiment of the present disclosure.
Figure 4B:
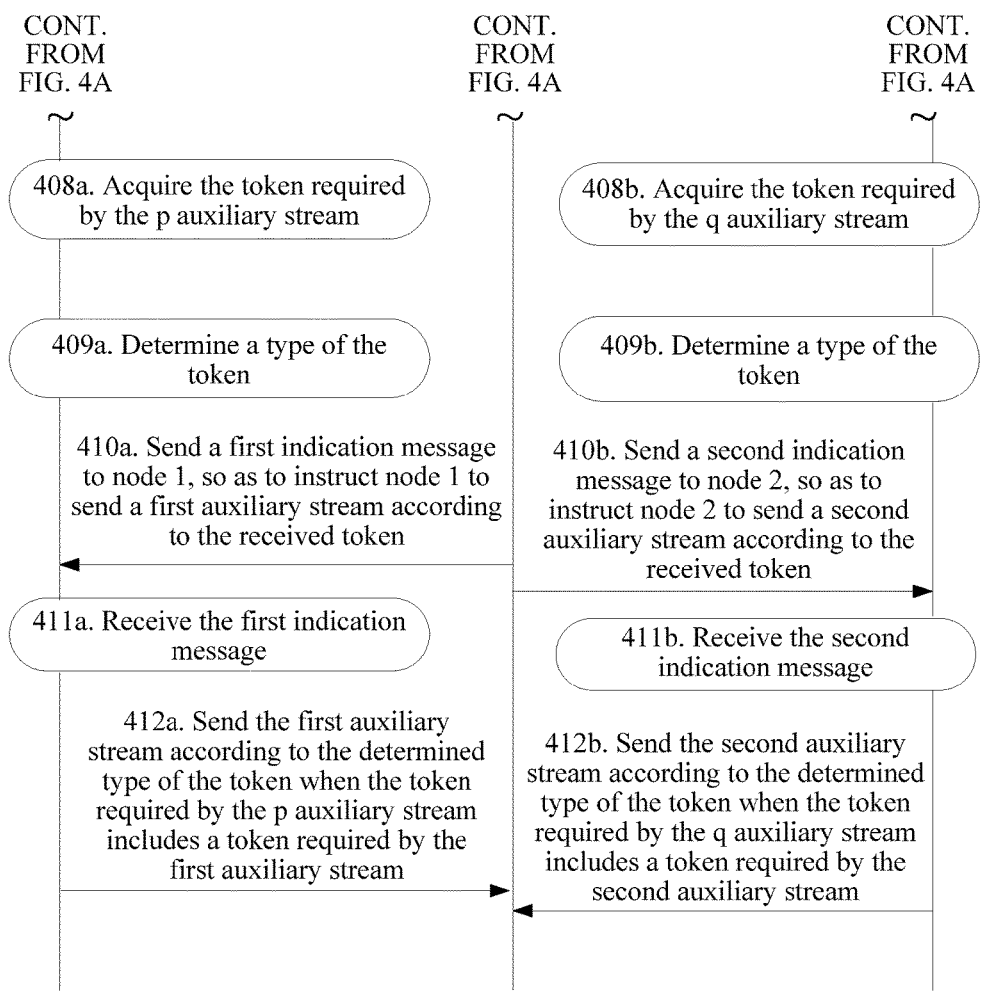

Optionally, an embodiment of the present disclosure further provides a method for controlling multiple auxiliary streams. This method is further described by using an interaction between two nodes (node 1 and node 2) and a control device, that is, n=2, where the nodes in this method passively receive tokens. As shown in FIG. 4A and FIG. 4B, the method includes the following steps:

Step 401a. Node 1 sends auxiliary stream resource information to a control device, where the auxiliary stream resource information is information that represents an auxiliary stream included in node 1.

The auxiliary stream resource information may include a quantity of auxiliary streams included in node 1, and/or a type of an auxiliary stream included in node 1, and/or a brief description of an auxiliary stream included in node 1.

For example, when node 1 is a conference site of a large conference, the auxiliary stream resource information may include slide 1, picture 1, and video clip 1, when node 1 is an application scenario of a hospital, the auxiliary stream resource information may include "an electrocardiogram", "a CT image", "a surgical field", and the like.

Step 401b. Node 2 sends auxiliary stream resource information to a control device, where the auxiliary stream resource information is information that represents an auxiliary stream included in node 2.

The auxiliary stream resource information may include a quantity of auxiliary streams included in node 2, and/or a type of an auxiliary stream included in node 2, and/or a brief description of an auxiliary stream included in node 2.

Step 402. The control device receives the auxiliary stream resource information reported by node 1 and node 2.

Step 403. The control device determines, according to the auxiliary stream resource information reported by node 1 and node 2, an auxiliary stream to which a token may be allocated.

In actual application, after receiving auxiliary stream resource information reported by a controlled node, a control device may not match all auxiliary streams of the controlled node with managed tokens because of a limited quantity of tokens managed by the control device. Therefore, an auxiliary stream to which a token may be allocated should be determined first. The control device may determine, according to information, such as a resolution, bandwidth, and a node, that is carried in the auxiliary stream resource information, the auxiliary stream to which a token may be allocated.

Exemplarily, in a large conference, auxiliary stream resource information reported from conference site 1 includes information about three auxiliary streams, slide 1, picture 1, and video 1, and auxiliary stream resource information reported from conference site 2 includes information about two auxiliary streams, slide 2 and picture 2. At a particular moment, a conference chairperson determines that auxiliary streams that may be sent are the auxiliary streams of conference site 1. Then, the control device determines, according to node information carried in the reported auxiliary stream resource information, that auxiliary streams to which a token may be allocated may be slide 1, picture 1, and video 1 of conference site 1.

Certainly, there may be another method for determining, according to the auxiliary stream resource information, the auxiliary stream to which a token may be allocated, which is not limited in this embodiment of the present disclosure.

Step 404. The control device matches a reserved token with the auxiliary stream to which a token may be allocated in order to acquire a correspondence between a token and an auxiliary stream.

After determining the auxiliary stream to which a token may be allocated, the control device matches the reserved token with the auxiliary stream to which a token may be allocated, which further includes the following three cases:

Case 1: The auxiliary stream resource information includes: a node number corresponding to an auxiliary stream included in each controlled node.

The matching a reserved token with the auxiliary stream to which a token may be allocated further includes matching, according to a first rule, the reserved token with the auxiliary stream to which a token may be allocated, where the first rule is as follows: a token is allocated by node, and auxiliary streams with a same node number are allocated a same token.

Case 2: The auxiliary stream resource information includes: an identifier of an auxiliary stream included in each controlled node.

The matching a reserved token with the auxiliary stream to which a token may be allocated further includes matching, according to a second rule, the reserved token with the auxiliary stream to which a token may be allocated, where the second rule is as follows: a token is allocated by auxiliary stream, and auxiliary streams with different auxiliary stream identifiers are allocated different tokens.

Case 3: The auxiliary stream resource information includes a node number corresponding to an auxiliary stream included in each controlled node, and an identifier of the auxiliary stream included in each controlled node.

The matching a reserved token with the auxiliary stream to which a token may be allocated further includes matching, according to a third rule, the reserved token with the auxiliary stream to which a token may be allocated, where the third rule is as follows: a parent token is allocated by node, and auxiliary streams with a same node number are allocated a same parent token, for auxiliary streams that have a same parent token, a child token is allocated by auxiliary stream, and auxiliary streams with different auxiliary stream identifiers are allocated different child tokens.

Step 405. The control device determines, according to an allocation policy, to allocate a token to m auxiliary streams, where in the m auxiliary streams, p auxiliary stream in the m auxiliary streams belongs to node 1, q auxiliary stream belongs to node 2, and m=p+q.

That the control device acquires a correspondence between a token and an auxiliary stream only means that an auxiliary stream may be allocated a token, but does not represent that an auxiliary stream is already allocated a token. Therefore, after matching the reserved token with the auxiliary stream to which a token may be allocated, the control device further determines, according to the allocation policy, to allocate the token to the m auxiliary streams.

It should be noted that the allocation policy may be a policy of precedence based on selection by a majority of users, a policy of first apply first allocated, or the like, which is not limited in this embodiment of the present disclosure.

Exemplarily, there are three conference sites in a conference, where a second conference site and a third conference site want to receive auxiliary stream 1 of a first conference site, the second conference site and the first conference site wants to receive auxiliary stream 3 of the third conference site, and the first conference site further wants to receive auxiliary stream 2 of the second conference site. In a case in which only two auxiliary streams may be allocated a token, when the allocation policy is the policy of precedence based on selection by a majority of users, it should be determined that the token is to be allocated to auxiliary stream 1 and auxiliary stream 3.

Step 406. The control device allocates a token required by the m auxiliary streams to the m auxiliary streams according to the acquired correspondence between a token and an auxiliary stream.

The correspondence represents a relationship between a token and an auxiliary stream corresponding to the token, therefore, after determining to allocate the token to the m auxiliary streams, the control device may allocate, according to the correspondence, the token required by the m auxiliary streams to the m auxiliary streams.

Step 407a. The control device sends, to node 1, a token that is required by the p auxiliary stream and allocated to node 1.

Step 408a. Node 1 acquires the token required by the p auxiliary stream.

When p=2, node 1 acquires tokens required by two auxiliary streams.

It should be noted that because a token has multiple forms, the token that is acquired by node 1 and is corresponding to the two auxiliary streams may be one token, or may be two tokens, which is determined according to a type of the token and is not limited in this embodiment of the present disclosure.

When the node acquires multiple tokens, the node may receive the multiple tokens simultaneously, or may receive the multiple tokens one by one, and the multiple tokens may be received in a random order, which is not limited in this embodiment of the present disclosure.

Step 409a. Node 1 determines a type of the token.

The type of the token includes a first token corresponding to a node, a second token corresponding to an auxiliary stream, or a child token that is corresponding to an auxiliary stream and has a corresponding parent token, where the parent token is a first token corresponding to a node.

The first token may further be classified into a token for multiple auxiliary streams and a token for a single auxiliary stream. The token for multiple auxiliary streams may be used to send multiple auxiliary streams, and the token for a single auxiliary stream may be used to send one auxiliary stream that is obtained by performing image processing such as combination, splicing, and Picture in Picture on some or all of multiple auxiliary streams.

The determining a type of the token may further lude determining the type of the token according to an identifier carried in the token, or determining the type of the token by sending a confirmation message to the control device, which is not limited in this embodiment of the present disclosure.

Step 410a. The control device sends a first indication message to node 1, where the first indication message is used to instruct the node 1 to send a first auxiliary stream according to the received token.

After the control device sends, to node 1, the token that is required by the p auxiliary stream and is allocated to node 1, the control device further sends the first indication message to the first node, where the first indication message may be triggered after the control device receives a request message that is sent by another node to request to acquire the first auxiliary stream, or may be triggered by the control device according to a control policy, which is not limited in this embodiment of the present disclosure.

Step 411a. Node 1 receives the first indication message.

After receiving the token required by the p auxiliary stream, node 1 does not necessarily send the p auxiliary stream. Instead, node 1 first determines, according to the first indication message, the first auxiliary stream that needs to be sent. The first auxiliary stream may be one auxiliary stream, or may be multiple auxiliary streams, which is not limited in this embodiment of the present disclosure and reference may be made to the description in step 203 in Embodiment 1, and which is determined only according to the first indication message.

Step 412a. Send the first auxiliary stream according to the determined type of the token when the token required by the p auxiliary stream includes a token required by the first auxiliary stream.

The sending the first auxiliary stream according to the determined type of the token when the token required by the p auxiliary stream includes a token required by the first auxiliary stream may further lude when the token is a token that is for multiple auxiliary streams and is corresponding to a node, establishing M auxiliary stream channels corresponding to the token required by the first auxiliary stream, where M is a quantity of auxiliary streams included in the first auxiliary stream, and sending the first auxiliary stream through the M auxiliary stream channels, or when the token is a token that is for a single auxiliary stream and is corresponding to a node, establishing one auxiliary stream channel corresponding to the token required by the first auxiliary stream, and when a quantity of auxiliary streams included in the first auxiliary stream is at least two, synthesizing the auxiliary streams included in the first auxiliary stream such that after the first auxiliary stream becomes one auxiliary stream, the synthesized auxiliary stream is sent through the established auxiliary stream channel, or when a quantity of auxiliary streams included in the first auxiliary stream is one, sending the first auxiliary stream directly through the established auxiliary stream channel, or when the token is a second token or a child token, establishing M auxiliary stream channels corresponding to the token required by the first auxiliary stream, where M is a quantity of auxiliary streams included in the first auxiliary stream, and sending the first auxiliary stream through the M auxiliary stream channels.

It should be noted that when the token required by the p auxiliary stream does not include the token required by the first auxiliary stream, the node should re-apply or wait for the token required by the first auxiliary stream according to a specific policy, which is not discussed in this embodiment of the present disclosure.

Step 407b. The control device sends, to node 2, a token that is required by the q auxiliary stream and allocated to node 2.

Step 408b. Node 2 acquires the token required by the q auxiliary stream.

Step 409b. Node 2 determines a type of the token.

Step 410b. The control device sends a second indication message to node 2, where the second indication message is used to instruct the node 2 to send a second auxiliary stream according to the received token.

It should be noted that, in this embodiment of the present disclosure, "second" in the "second indication message" and the "second auxiliary stream" does not have any special meaning, and is merely used for differentiation from the first indication message and the first auxiliary stream that are received by node 1. In essence, either the first indication message or the second indication message is an indication message sent by the control device to a node to instruct the node to send an auxiliary stream according to a received token.

Step 411b. Node 2 receives the second indication message.

Step 412b. Send the second auxiliary stream according to the determined type of the token when the token required by the q auxiliary stream includes a token required by the second auxiliary stream.

Furthermore, for actions performed by node 2 in steps 407b to 412b, reference may be made to the actions performed by node 1 in steps 407a to 412a, which are not described again in this embodiment of the present disclosure.

A person skilled in the art may understand that this embodiment of the present disclosure is described by using n=2 as an example, certainly, the method for controlling multiple auxiliary streams may also be applied to cases in which the value of n is 3, 4, 5 . . . . For the method for controlling multiple auxiliary streams when the value of n is 3, 4, 5 . . . , reference may be made to the method for controlling multiple auxiliary streams when n=2, and therefore will not be described repeatedly in this embodiment of the present disclosure.

The embodiments shown in FIG. 3A and FIG. 3B, and FIG. 4A and FIG. 4B elaborate on a method for controlling multiple auxiliary streams according to an interaction between a node and a control device. The control device determines to allocate a token to m auxiliary streams, and allocates a token to the m auxiliary streams, where the m auxiliary streams belong to n node, $n \geq 1$, $m \geq 2$, and $m \geq n$, then, the control device sends a token allocated to an auxiliary stream of a first node to the first node, where the first node is one node of the n node such that the first node may acquire at least one token and therefore may have permission to send an auxiliary stream, then, the control device sends a first indication message to the first node, where the first indication message is used to instruct the first node to send a first auxiliary stream according to the received token such that the first node may send the first auxiliary stream after receiving the first indication message, where the first auxiliary stream includes at least one auxiliary stream of the m auxiliary streams. Ultimately, simultaneously sending auxiliary streams by multiple nodes may be implemented.

Further, after multiple nodes may simultaneously send an auxiliary stream to the control device, the control device may further send an auxiliary stream to a managed node. That is, after the sending a first indication message to the first node, the method further includes acquiring the first auxiliary stream sent by the first node, and sending the first auxiliary stream to a fourth node.

The first indication message is sent by the control device, which may be triggered by a user of a receiving party, or may be triggered by a user of a sending party. The following provides further description with reference to the two cases.

When the first indication message is triggered by the user of the receiving party, that is, triggered on a fourth node side, before the control device sends a first indication message to the first node, the method further includes receiving a first request message sent by the fourth node, where the first request message is used to request to acquire the first auxiliary stream, and the sending a first indication message to the first node includes sending the first indication message to the first node according to the first request message.

Exemplarily, when the fourth node wants to receive auxiliary stream 1 and auxiliary stream 2, a related user may trigger a control related to auxiliary stream 1 and auxiliary stream 2 such that the fourth node sends a first request message to the control device, where the first request message is used to request to acquire auxiliary stream 1 and auxiliary stream 2. After receiving the first request message, the control device sends, according to the first request message, a first indication message to the first node. After receiving the first indication message, the first node sends auxiliary stream 1 and auxiliary stream 2 such that the control device receives auxiliary stream 1 and auxiliary stream 2, and sends auxiliary stream 1 and auxiliary stream 2 to the fourth node.

Optionally, when the first indication message is triggered by the user of the sending party, that is, triggered on a first node side, the sending, by the control device, a first indication message to the first node includes sending the first indication message to the first node according to a control policy.

Exemplarily, when the first node wants to send auxiliary stream 1 and auxiliary stream 2, a control related to auxiliary stream 1 and auxiliary stream 2 may be triggered. After detecting an operation performed by the user of the sending party, the control device may determine, according to a mechanism, to receive only auxiliary stream 2 and send auxiliary stream 2 to a second node. In this case, the control device delivers a first indication message to the first node. After receiving the first indication message, the first node sends auxiliary stream 2 such that the control device receives auxiliary stream 2 and sends auxiliary stream 2 to the second node.

Further, when the control device sends, according to the control policy, the first indication message to the first node, and acquires the first auxiliary stream sent by the first node, before the sending the first auxiliary stream to a fourth node, the control device further sends a query message to the fourth node to negotiate, with the fourth node, whether the fourth node may receive the first auxiliary stream in order to ensure a smooth process of sending and receiving the auxiliary stream and avoid a waste of a resource. That is, the method may further include sending a query message, where the query message is used to query whether the fourth node may receive the first auxiliary stream, and receiving a confirmation message sent by the fourth node, where the confirmation message indicates that the fourth node may receive the first auxiliary stream such that the control device sends the first auxiliary stream to the fourth node.

It should be noted that when no confirmation message sent by the fourth node is received, it indicates that the control device determines to send the first auxiliary stream to the fourth node, but the fourth node cannot receive the first auxiliary stream, that is, the negotiation between the control device and the fourth node fails. In this case, the control device cannot send the first auxiliary stream to the fourth node.

Exemplarily, when the control device determines to send auxiliary stream 1 and auxiliary stream 2 to the fourth node, and when the fourth node does not send a confirmation message to the control device after a control device sends a query message to the fourth node, the control device does not send auxiliary stream 1 and auxiliary stream 2 to the fourth node.

With reference to the foregoing embodiments, using an example in which the token type is the first token, the following provides three system framework diagrams showing that different nodes receive and send an auxiliary stream after the nodes acquire a token, which are respectively shown in FIG. 5, FIG. 6, and FIG. 7 and briefly described as follows.

Figure 5:
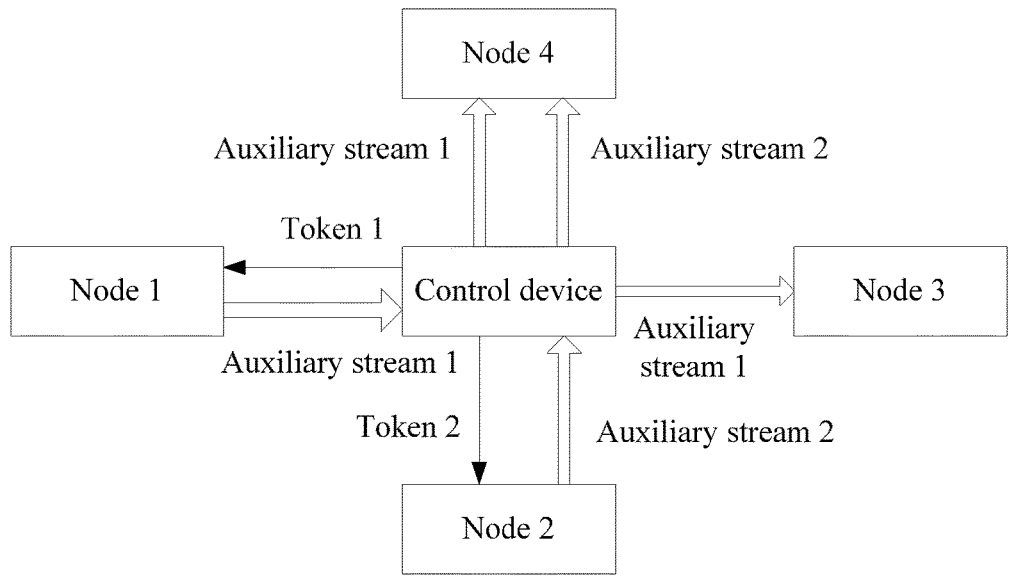
FIG. 5 is a diagram of a framework of a system according to an embodiment of the present disclosure.

As shown in FIG. 5, node 1 and node 2 respectively obtain token 1 and token 2 from a control device, and therefore, node 1 and node 2 are respectively capable of sending an auxiliary stream, node 3 and node 4 do not obtain a token and therefore are incapable of sending an auxiliary stream. Node 1 sends auxiliary stream 1, and node 2 sends auxiliary stream 2. According to a policy, node 1 and node 2 cannot receive any other auxiliary streams, node 3 may receive only auxiliary stream 1, and node 4 may receive auxiliary stream 1 and auxiliary stream 2. The policy may be as follows: a node determines an auxiliary stream that the node wants to receive, a control device determines an auxiliary stream that the control device wants to send, and the node and the control device negotiates transmission of an auxiliary stream.

Figure 6:
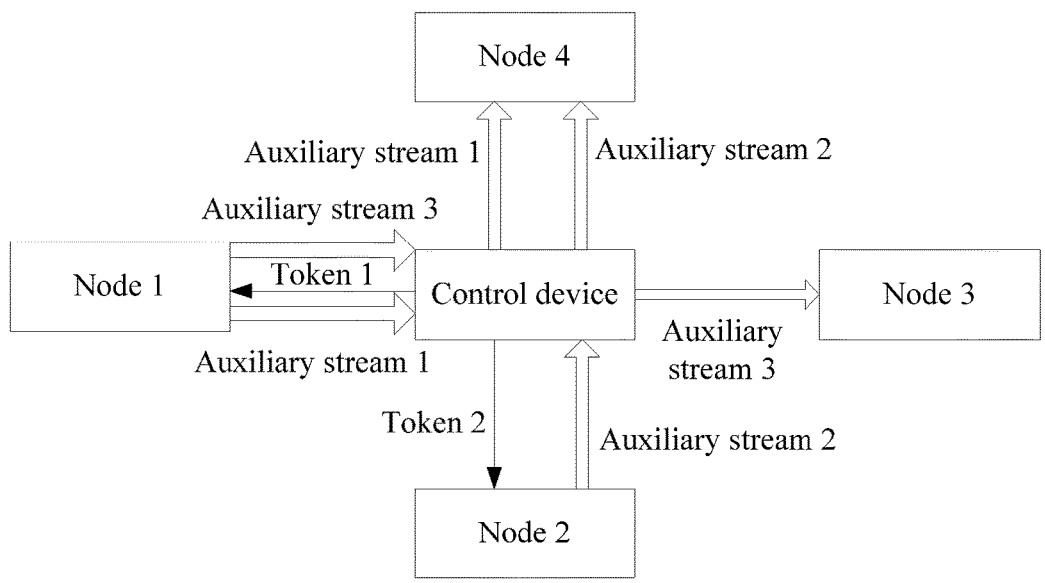
FIG. 6 is a diagram of a framework of another system according to an embodiment of the present disclosure.
Figure 7:
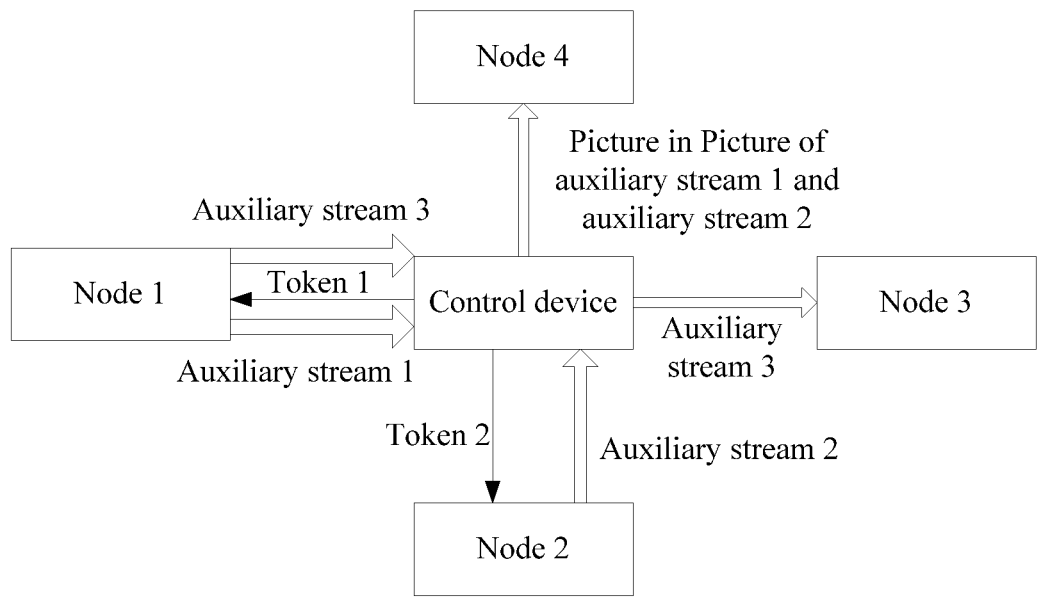
FIG. 7 is a diagram of a framework of still another system according to an embodiment of the present disclosure.

Different from FIG. 5, in FIG. 6, node 1 may send multiple auxiliary streams, for example, auxiliary stream 1 and auxiliary stream 3 after acquiring token 1.

Certainly, after receiving multiple auxiliary streams, the control device may perform processing on any combination of the multiple auxiliary streams such that a node controlled by the control device may receive any combination of these auxiliary streams, where the performing processing on any combination of the multiple auxiliary streams includes synthesis for continuous presence, synthesis for Picture in Picture, resolution change, bit rate adjustment, and the like. As shown in FIG. 7, continuous presence obtained by synthesizing auxiliary stream 1 and auxiliary stream 2 may be sent to node 4.

It should be noted that the node in this embodiment of the present disclosure may be a conference terminal at each conference site, may be a media gateway, or may be a conference application server, which is not limited in this embodiment of the present disclosure, one node may include multiple conference terminals, which is also not limited in this embodiment of the present disclosure either.

Based on the foregoing description of this embodiment of the present disclosure, a control device determines to allocate a token to m auxiliary streams, and allocates a token to the m auxiliary streams, where the m auxiliary streams belong to n node, $n \geq 1$, $m \geq 2$, and $m \geq n$, then, the control device sends a token allocated to an auxiliary stream of a first node to the first node, where the first node is one node of the n node such that the first node may obtain the token, then, the control device sends a first indication message to the first node, where the first indication message is used to instruct the first node to send a first auxiliary stream according to the received token such that the first node may send the first auxiliary stream after receiving the first indication message, where the first auxiliary stream includes at least one auxiliary stream of the m auxiliary streams. Ultimately, simultaneously sending auxiliary streams by multiple nodes may be implemented.

Embodiment 3

Figure 8:
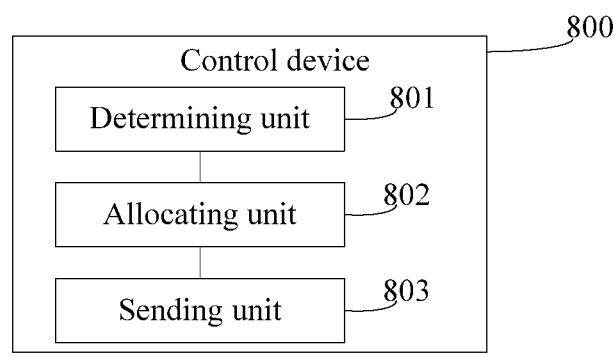
FIG. 8 is a schematic diagram of a structure of a control device according to an embodiment of the present disclosure.

An embodiment of the present disclosure provides a control device 800. As shown in FIG. 8, the control device 800 includes a determining unit 801, an allocating unit 802, and a sending unit 803.

The determining unit 801 is configured to determine to allocate a token to m auxiliary streams, where the m auxiliary streams belong to n node, $n \geq 1$, $m \geq 2$, and $m \geq n$.

The allocating unit 802 is configured to allocate a token to the m auxiliary streams determined by the determining unit 801.

The sending unit 803 is configured to send a token allocated by the allocating unit 802 to an auxiliary stream of a first node to the first node, where the first node is one node of the n node.

The sending unit 803 is further configured to send a first indication message to the first node, where the first indication message is used to instruct the first node to send a first auxiliary stream according to the received token, and the first auxiliary stream includes at least one auxiliary stream of the m auxiliary streams.

Figure 9:
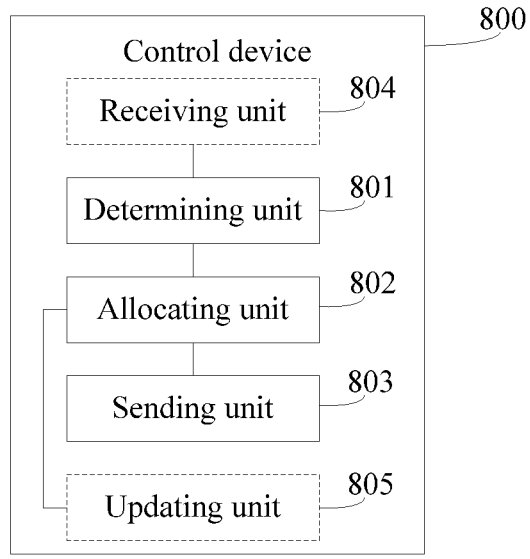
FIG. 9 is a schematic diagram of a structure of another control device according to an embodiment of the present disclosure.

Further, as shown in FIG. 9, the control device 800 further includes a receiving unit 804 and an updating unit 805.

The receiving unit 804 is configured to, before the determining unit 801 determines to allocate the token to the m auxiliary streams, receive a request message from the n node, where the request message from the n node is used to request to acquire a token required for sending the m auxiliary streams.

The determining unit 801 determining to allocate a token to m auxiliary streams further includes searching, according to the request message from the n node, for pre-stored token information, where the token information is information that represents an occupancy status of a token, and determining to allocate the token to the m auxiliary streams when the token information represents that the token required by the m auxiliary streams is not occupied.

The allocating unit 802 allocating a token to the m auxiliary streams includes allocating, according to the token information, the token required by the m auxiliary streams to the m auxiliary streams.

The updating unit 805 is configured to update the token information after the allocating unit 802 allocates the token to the m auxiliary streams.

In a possible implementation manner, the token is a first token corresponding to a node.

The token information includes a quantity of idle tokens, and a correspondence between a used token and a token-allocated node.

The determining unit 801 determining to allocate the token to the m auxiliary streams when the token information represents that the token required by the m auxiliary streams is not occupied further includes when the quantity of idle tokens is not less than n, determining to allocate the token to the m auxiliary streams.

The updating unit 805 updating the token information includes updating, in the token information, the quantity of idle tokens, and information about the correspondence between a used token and a token-allocated node.

In a possible implementation manner, the token is a second token corresponding to an auxiliary stream.

The token information includes a quantity of idle tokens, and a correspondence between a used token and a token-allocated auxiliary stream of a node.

The determining unit 801 determining to allocate the token to the m auxiliary streams when the token information represents that the token required by the m auxiliary streams is not occupied further includes when the quantity of idle tokens is not less than m, determining to allocate the token to the m auxiliary streams.

The updating unit 805 updating the token information includes updating, in the token information, the quantity of idle tokens, and information about the correspondence between a used token and a token-allocated auxiliary stream of a node.

In a possible implementation manner, the token is a child token corresponding to an auxiliary stream, where the child token has a corresponding parent token, and the parent token is a first token corresponding to a node.

The token information includes a quantity of idle parent tokens, a quantity of idle child tokens included in each idle parent token, a correspondence between a used parent token and a token-allocated node, a correspondence between the used parent token and a quantity of idle child tokens included in the used parent token, and a correspondence between a used child token included in the used parent token and a token-allocated auxiliary stream.

The determining unit 801 determining to allocate the token to the m auxiliary streams when the token information represents that the token required by the m auxiliary streams is not occupied further includes when a quantity of tokens requested by a second node in the n node is not greater than a quantity of idle child tokens included in a parent token corresponding to the second node, a quantity of third nodes in the n node is not greater than the quantity of idle parent tokens in the token information, and a quantity of tokens requested by each third node is not greater than a quantity of idle child tokens included in a parent token corresponding to the third node, determining to allocate the token to the m auxiliary streams, where the second node is a node to which a used parent token is allocated, and the third node is a node to which no parent token is allocated.

The updating unit 805 updating the token information includes updating, in the token information, the quantity of idle parent tokens, the quantity of idle child tokens included in each idle parent token, the correspondence between a used parent token and a token-allocated node, the correspondence between a used parent token and a quantity of idle child tokens included in the used parent token, and the correspondence between a used child token included in a used parent token and a token-allocated auxiliary stream.

Figure 10:
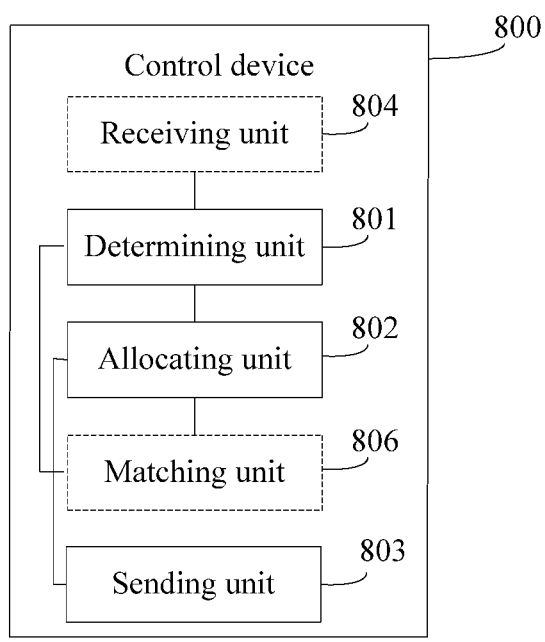
FIG. 10 is a schematic diagram of a structure of still another control device according to an embodiment of the present disclosure.

Optionally, as shown in FIG. 10, the control device 800 further includes a receiving unit 804 and a matching unit 806.

The receiving unit 804 is configured to, before the determining unit 801 determines to allocate the token to the m auxiliary streams, receive auxiliary stream resource information reported by a controlled node, where the auxiliary stream resource information is information that represents an auxiliary stream included in the controlled node.

The determining unit 801 is further configured to determine, according to the auxiliary stream resource information, an auxiliary stream to which a token may be allocated.

The matching unit 806 is configured to match a reserved token with the auxiliary stream to which a token may be allocated in order to acquire a correspondence between a token and an auxiliary stream.

The determining unit 801 determining to allocate a token to m auxiliary streams further includes determining, according to an allocation policy, to allocate the token to the m auxiliary streams.

The allocating unit 802 allocating a token to the m auxiliary streams includes allocating, according to the correspondence that is between a token and an auxiliary stream and is acquired by the matching unit 806, the token required by the m auxiliary streams to the m auxiliary streams.

Further, the auxiliary stream resource information further includes a quantity of auxiliary streams included in each controlled node, and/or a type of an auxiliary stream included in each controlled node, and/or a brief description of an auxiliary stream included in each controlled node.

In a possible implementation manner, the auxiliary stream resource information includes a node number corresponding to an auxiliary stream included in each controlled node.

The matching unit 806 matching a reserved token with the auxiliary stream to which a token may be allocated further includes matching, according to a first rule, the reserved token with the auxiliary stream to which a token may be allocated, where the first rule is as follows: a token is allocated by node, and auxiliary streams with a same node number are allocated a same token.

In a possible implementation manner, the auxiliary stream resource information includes an identifier of an auxiliary stream included in each controlled node.

The matching unit 806 matching a reserved token with the auxiliary stream to which a token may be allocated further includes matching, according to a second rule, the reserved token with the auxiliary stream to which a token may be allocated, where the second rule is as follows: a token is allocated by auxiliary stream, and auxiliary streams with different auxiliary stream identifiers are allocated different tokens.

In a possible implementation manner, the auxiliary stream resource information includes a node number corresponding to an auxiliary stream included in each controlled node, and an identifier of the auxiliary stream included in each controlled node.

The matching unit 806 matching a reserved token with the auxiliary stream to which a token may be allocated further includes matching, according to a third rule, the reserved token with the auxiliary stream to which a token may be allocated, where the third rule is as follows: a parent token is allocated by node, and auxiliary streams with a same node number are allocated a same parent token, for auxiliary streams that have a same parent token, a child token is allocated by auxiliary stream, and auxiliary streams with different auxiliary stream identifiers are allocated different child tokens.

Figure 11:
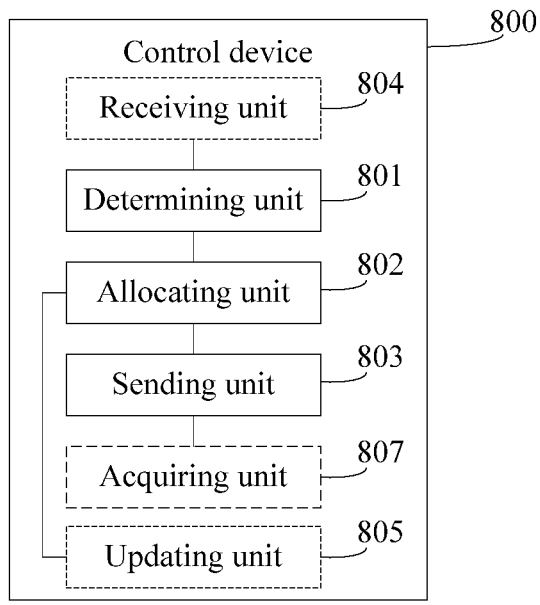
FIG. 11 is a schematic diagram of a structure of still another control device according to an embodiment of the present disclosure.
Figure 12:
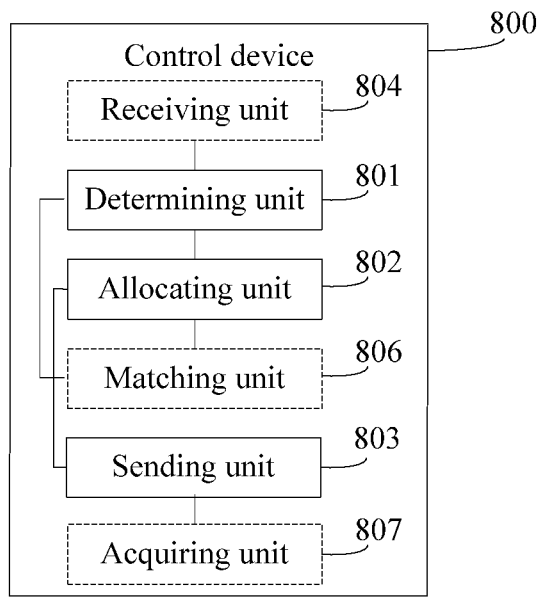
FIG. 12 is a schematic diagram of a structure of still another control device according to an embodiment of the present disclosure.

Further, as shown in FIG. 11 or FIG. 12, the control device 800 further includes an acquiring unit 807.

The acquiring unit 807 is configured to, after the sending unit 803 sends the first indication message to the first node, acquire the first auxiliary stream sent by the first node.

The sending unit 803 is further configured to send the first auxiliary stream acquired by the acquiring unit 807 to a fourth node.

Further, the receiving unit 804 is further configured to, before the sending unit 803 sends the first indication message to the first node, receive a first request message sent by the fourth node, where the first request message is used to request to acquire the first auxiliary stream.

The sending unit 803 sending a first indication message to the first node includes sending the first indication message to the first node according to the first request message.

Optionally, the sending unit 803 sending a first indication message to the first node includes sending the first indication message to the first node according to a control policy.

Further, the sending unit 803 is further configured to send a query message before sending the first auxiliary stream to the fourth node, where the query message is used to query whether the fourth node may receive the first auxiliary stream.

The receiving unit 804 is further configured to receive a confirmation message sent by the fourth node, where the confirmation message is used to indicate that the fourth node may receive the first auxiliary stream.

For a method for controlling multiple auxiliary streams by using the control device, reference may be made to the descriptions in Embodiment 1 and Embodiment 2, and details are not described again in this embodiment of the present disclosure.

This embodiment of the present disclosure provides a control device, including a determining unit determines to allocate a token to m auxiliary streams, and an allocating unit allocates a token to the m auxiliary streams, where the m auxiliary streams belong to n node, n≥1, m≥2, and m≥n, then, a sending unit sends a token allocated to an auxiliary stream of a first node to the first node, where the first node is one node of the n node such that the first node may acquire the token, then, the sending unit sends a first indication message to the first node, where the first indication message is used to instruct the first node to send a first auxiliary stream according to the received token such that the first node may send the first auxiliary stream after receiving the first indication message, where the first auxiliary stream includes at least one auxiliary stream of the m auxiliary streams. By using the control device provided in this embodiment of the present disclosure, simultaneously sending auxiliary streams by multiple nodes may ultimately be implemented.

Embodiment 4

Figure 13:
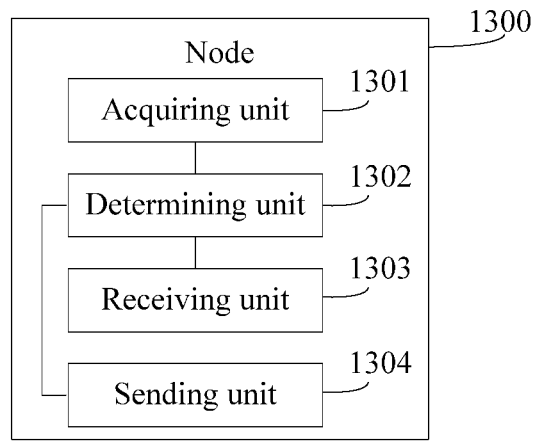
FIG. 13 is a schematic diagram of a structure of a node according to an embodiment of the present disclosure.

An embodiment of the present disclosure provides a node 1300. As shown in FIG. 13, the node 1300 includes an acquiring unit 1301, a determining unit 1302, a receiving unit 1303, and a sending unit 1304.

The acquiring unit 1301 is configured to acquire, from a control device, a token required by at least one auxiliary stream.

The determining unit 1302 is configured to determine a type of the token.

The receiving unit 1303 is configured to receive a first indication message sent by the control device, where the first indication message is used to instruct the node 1300 to send a first auxiliary stream.

The sending unit 1304 is configured to send the first auxiliary stream according to the determined type of the token when the token required by the at least one auxiliary stream includes a token required by the first auxiliary stream.

Further, the sending unit 1304 is further configured to, before the acquiring unit 1301 acquires, from the control device, the token required by the at least one auxiliary stream, send a request message to the control device, where the request message is used to request to acquire the token required by the at least one auxiliary stream.

In a possible implementation manner, the type of the token is a first token corresponding to the node and is a token for multiple auxiliary streams.

The sending unit 1304 sending the first auxiliary stream according to the determined type of the token when the token required by the at least one auxiliary stream includes a token required by the first auxiliary stream further includes establishing M auxiliary stream channels corresponding to the token required by the first auxiliary stream, where M is a quantity of auxiliary streams included in the first auxiliary stream, and sending the first auxiliary stream through the M auxiliary stream channels.

In a possible implementation manner, the token is a first token corresponding to the node and is a token for a single auxiliary stream.

The sending unit 1304 sending the first auxiliary stream according to the determined type of the token when the token required by the at least one auxiliary stream includes a token required by the first auxiliary stream further includes establishing one auxiliary stream channel corresponding to the token required by the first auxiliary stream, and when a quantity of auxiliary streams included in the first auxiliary stream is at least two, synthesizing the auxiliary streams included in the first auxiliary stream such that the first auxiliary stream becomes one auxiliary stream, and sending the synthesized first auxiliary stream through the established auxiliary stream channel, or when a quantity of auxiliary streams included in the first auxiliary stream is one, sending the first auxiliary stream through the established auxiliary stream channel.

In a possible implementation manner, the token is a second token corresponding to an auxiliary stream, or the token is a child token that is corresponding to an auxiliary stream and has a corresponding parent token, where the parent token is a first token corresponding to the node.

The sending unit 1304 sending the first auxiliary stream according to the determined type of the token when the token required by the at least one auxiliary stream includes a token required by the first auxiliary stream further includes establishing M auxiliary stream channels corresponding to the token required by the first auxiliary stream, where M is a quantity of auxiliary streams included in the first auxiliary stream, and sending the first auxiliary stream through the M auxiliary stream channels.

Further, the token is the child token that is corresponding to an auxiliary stream and has a corresponding parent token.

The acquiring unit 1301 is further configured to, after the sending unit 1304 sends the request message to the control device, and before the token required by the at least one auxiliary stream is acquired from the control device, acquire, from the control device, a parent token of a node corresponding to the at least one auxiliary stream, where the parent token includes at least one idle child token in order to acquire the token required by the at least one auxiliary stream.

Optionally, the sending unit 1304 is further configured to, before the acquiring unit 1301 acquires, from the control device, the token required by the at least one auxiliary stream, send auxiliary stream resource information of the node 1300 to the control device such that after determining, according to the auxiliary stream resource information, an auxiliary stream to which a token may be allocated, the control device matches the auxiliary stream to which a token may be allocated with a reserved token and performs management, and allocates, with reference to an allocation policy, the token to the at least one auxiliary stream, where the auxiliary stream resource information is information that represents an auxiliary stream included in the node 1300.

Further, the auxiliary stream resource information further includes a quantity of auxiliary streams included in the node 1300, and/or a type of an auxiliary stream included in the node 1300, and/or a brief description of an auxiliary stream included in the node 1300.

In a possible implementation manner, the auxiliary stream resource information includes a node number of the node 1300.

The sending unit 1304 sending auxiliary stream resource information of the node 1300 to the control device such that after determining, according to the auxiliary stream resource information, an auxiliary stream to which a token may be allocated, the control device matches the auxiliary stream to which a token may be allocated with a reserved token and performs management, and allocates, with reference to an allocation policy, the token to the at least one auxiliary stream further includes sending the auxiliary stream resource information of the node 1300 to the control device such that after determining, according to the auxiliary stream resource information, the auxiliary stream to which a token may be allocated, the control device matches the auxiliary stream to which a token may be allocated with the reserved token and performs management according to a first rule, and allocates, with reference to the allocation policy, the token to the at least one auxiliary stream, where the first rule is as follows: a token is allocated by node 1300, and auxiliary streams with a same node number are allocated a same token.

In a possible implementation manner, the auxiliary stream resource information includes an identifier of an auxiliary stream included in the node 1300.

The sending unit 1304 sending auxiliary stream resource information of the node 1300 to the control device such that after determining, according to the auxiliary stream resource information, an auxiliary stream to which a token may be allocated, the control device matches the auxiliary stream to which a token may be allocated with a reserved token and performs management, and allocates, with reference to an allocation policy, the token to the at least one auxiliary stream further includes sending the auxiliary stream resource information of the node 1300 to the control device such that after determining, according to the auxiliary stream resource information, the auxiliary stream to which a token may be allocated, the control device matches the auxiliary stream to which a token may be allocated with the reserved token and performs management according to a second rule, and allocates, with reference to the allocation policy, the token to the at least one auxiliary stream, where the second rule is as follows: a token is allocated by auxiliary stream, and auxiliary streams with different auxiliary stream identifiers are allocated different tokens.

In a possible implementation manner, the auxiliary stream resource information includes a node number of the node 1300, and an identifier of an auxiliary stream included in the node 1300.

The sending unit 1304 sending auxiliary stream resource information of the node 1300 to the control device such that after determining, according to the auxiliary stream resource information, an auxiliary stream to which a token may be allocated, the control device matches the auxiliary stream to which a token may be allocated with a reserved token and performs management, and allocates, with reference to an allocation policy, the token to the at least one auxiliary stream further includes sending the auxiliary stream resource information of the node 1300 to the control device such that after determining, according to the auxiliary stream resource information, the auxiliary stream to which a token may be allocated, the control device matches the auxiliary stream to which a token may be allocated with the reserved token and performs management according to a third rule, and allocates, with reference to the allocation policy, the token to the at least one auxiliary stream, where the third rule is as follows: a parent token is allocated by node 1300, and auxiliary streams with a same node number are allocated a same parent token, for auxiliary streams that have a same parent token, a child token is allocated by auxiliary stream, and auxiliary streams with different auxiliary stream identifiers are allocated different child tokens.

For a method for controlling multiple auxiliary streams via the node, reference may be made to the descriptions in Embodiment 1 and Embodiment 2, and details are not described again in this embodiment of the present disclosure.

This embodiment of the present disclosure provides a node, including an acquiring unit acquires, from a control device, a token required by at least one auxiliary stream, a determining unit determines a type of the token, and a receiving unit receives a first indication message sent by the control device, where the first indication message is used to instruct the node to send a first auxiliary stream, and then, when the token that is required by the at least one auxiliary stream and is acquired by the acquiring unit includes a token required by the first auxiliary stream, the first auxiliary stream is sent according to the type that is of the token and is determined by the determining unit. Based on the node provided in this embodiment of the present disclosure, when the control device controls different nodes to simultaneously send auxiliary streams, sending, by the nodes, the auxiliary streams to the control device may be implemented.

Embodiment 5

Figure 14:
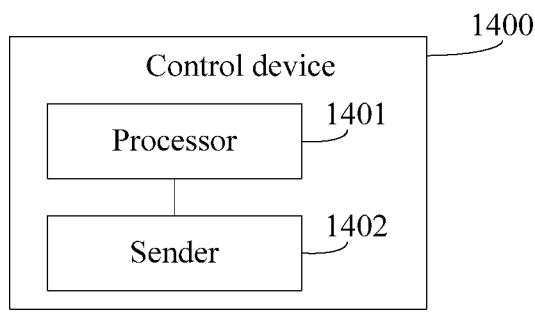
FIG. 14 is a schematic diagram of a structure of a control device according to an embodiment of the present disclosure.

An embodiment of the present disclosure provides a control device 1400. As shown in FIG. 14, the control device 1400 includes a processor 1401 and a sender 1402.

The processor 1401 is configured to determine to allocate a token to m auxiliary streams, where the m auxiliary streams belong to n node, n≥1, m≥2, and m≥n.

The processor 1401 is further configured to allocate a token to the m auxiliary streams.

The sender 1402 is configured to send a token allocated by the processor 1401 to an auxiliary stream of a first node to the first node, where the first node is one node of the n node.

The sender 1402 is further configured to send a first indication message to the first node, where the first indication message is used to instruct the first node to send a first auxiliary stream according to the received token, and the first auxiliary stream includes at least one auxiliary stream of the m auxiliary streams.

Figure 15:
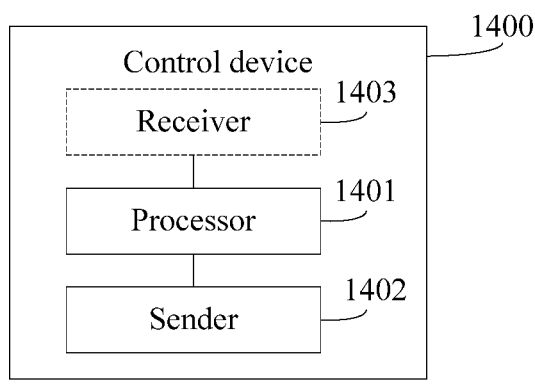
FIG. 15 is a schematic diagram of a structure of another control device according to an embodiment of the present disclosure.

Further, as shown in FIG. 15, the control device 1400 further includes a receiver 1403.

The receiver 1403 is configured to, before the processor 1401 determines to allocate the token to the m auxiliary streams, receive a request message from the n node, where the request message from the n node is used to request to acquire a token required for sending the m auxiliary streams.

The determining, by the processor 1401, to allocate a token to m auxiliary streams further includes searching, according to the request message from the n node, for pre-stored token information, where the token information is information that represents an occupancy status of a token, and determining to allocate the token to the m auxiliary streams when the token information represents that the token required by the m auxiliary streams is not occupied, and the allocating, by the processor 1401, a token to m auxiliary streams includes allocating, according to the token information, the token required by the m auxiliary streams to the m auxiliary streams.

The processor 1401 is further configured to update the token information after allocating the token to the m auxiliary streams.

In a possible implementation manner, the token is a first token corresponding to a node.

The token information includes a quantity of idle tokens, and a correspondence between a used token and a token-allocated node.

The determining, by the processor 1401, to allocate the token to the m auxiliary streams when the token information represents that the token required by the m auxiliary streams is not occupied further includes when the quantity of idle tokens is not less than n, determining to allocate the token to the m auxiliary streams.

The updating, by the processor 1401, the token information includes updating, in the token information, the quantity of idle tokens, and information about the correspondence between a used token and a token-allocated node.

In a possible implementation manner, the token is a second token corresponding to an auxiliary stream.

The token information includes a quantity of idle tokens, and a correspondence between a used token and a token-allocated auxiliary stream of a node.

The determining, by the processor 1401, to allocate the token to the m auxiliary streams when the token information represents that the token required by the m auxiliary streams is not occupied further includes when the quantity of idle tokens is not less than m, determining to allocate the token to the m auxiliary streams.

The updating, by the processor 1401, the token information includes updating, in the token information, the quantity of idle tokens, and information about the correspondence between a used token and a token-allocated auxiliary stream of a node.

In a possible implementation manner, the token is a child token corresponding to an auxiliary stream, where the child token has a corresponding parent token, and the parent token is a first token corresponding to a node.

The token information includes a quantity of idle parent tokens, a quantity of idle child tokens included in each idle parent token, a correspondence between a used parent token and a token-allocated node, a correspondence between the used parent token and a quantity of idle child tokens included in the used parent token, and a correspondence between a used child token included in the used parent token and a token-allocated auxiliary stream.

The determining, by the processor 1401, to allocate the token to the m auxiliary streams when the token information represents that the token required by the m auxiliary streams is not occupied further includes when a quantity of tokens requested by a second node in the n node is not greater than a quantity of idle child tokens included in a parent token corresponding to the second node, a quantity of third nodes in the n node is not greater than the quantity of idle parent tokens in the token information, and a quantity of tokens requested by each third node is not greater than a quantity of idle child tokens included in a parent token corresponding to the third node, determining to allocate the token to the m auxiliary streams, where the second node is a node to which a used parent token is allocated, and the third node is a node to which no parent token is allocated.

The updating, by the processor 1401, the token information includes updating, in the token information, the quantity of idle parent tokens, the quantity of idle child tokens included in each idle parent token, the correspondence between a used parent token and a token-allocated node, the correspondence between a used parent token and a quantity of idle child tokens included in the used parent token, and the correspondence between a used child token included in a used parent token and a token-allocated auxiliary stream.

Optionally, as shown in FIG. 15, the control device 1400 further includes a receiver 1403.

The receiver 1403 is configured to, before the processor 1401 determines to allocate the token to the m auxiliary streams, receive auxiliary stream resource information reported by a controlled node, where the auxiliary stream resource information is information that represents an auxiliary stream included in the controlled node.

The processor 1401 is further configured to determine, according to the auxiliary stream resource information, an auxiliary stream to which a token may be allocated.

The processor 1401 is configured to match a reserved token with the auxiliary stream to which a token may be allocated in order to acquire a correspondence between a token and an auxiliary stream.

The determining, by the processor 1401, to allocate a token to m auxiliary streams further includes determining, according to an allocation policy, to allocate the token to the m auxiliary streams.

The allocating, by the processor 1401, a token to the m auxiliary streams includes allocating, according to the acquired correspondence between a token and an auxiliary stream, the token required by the m auxiliary streams to the m auxiliary streams.

Further, the auxiliary stream resource information further includes a quantity of auxiliary streams included in each controlled node, and/or a type of an auxiliary stream included in each controlled node, and/or a brief description of an auxiliary stream included in each controlled node.

In a possible implementation manner, the auxiliary stream resource information includes a node number corresponding to an auxiliary stream included in each controlled node.

The matching, by the processor 1401, a reserved token with the auxiliary stream to which a token may be allocated further includes matching, according to a first rule, the reserved token with the auxiliary stream to which a token may be allocated, where the first rule is as follows: a token is allocated by node, and auxiliary streams with a same node number are allocated a same token.

In a possible implementation manner, the auxiliary stream resource information includes an identifier of an auxiliary stream included in each controlled node.

The matching, by the processor 1401, a reserved token with the auxiliary stream to which a token may be allocated further includes matching, according to a second rule, the reserved token with the auxiliary stream to which a token may be allocated, where the second rule is as follows: a token is allocated by auxiliary stream, and auxiliary streams with different auxiliary stream identifiers are allocated different tokens.

In a possible implementation manner, the auxiliary stream resource information includes a node number corresponding to an auxiliary stream included in each controlled node, and an identifier of the auxiliary stream included in each controlled node.

The matching, by the processor 1401, a reserved token with the auxiliary stream to which a token may be allocated further includes matching, according to a third rule, the reserved token with the auxiliary stream to which a token may be allocated, where the third rule is as follows: a parent token is allocated by node, and auxiliary streams with a same node number are allocated a same parent token, for auxiliary streams that have a same parent token, a child token is allocated by auxiliary stream, and auxiliary streams with different auxiliary stream identifiers are allocated different child tokens.

Further, the processor 1401 is configured to, after the sender 1402 sends the first indication message to the first node, acquire the first auxiliary stream sent by the first node.

The sender 1402 is further configured to send the first auxiliary stream acquired by the processor 1401 to a fourth node.

Further, the receiver 1403 is further configured to, before the sender 1402 sends a first indication message to the first node, receive a first request message sent by the fourth node, where the first request message is used to request to acquire the first auxiliary stream.

The sending, by the sender 1402, a first indication message to the first node includes sending the first indication message to the first node according to the first request message.

Optionally, the sending, by the sender 1402, a first indication message to the first node includes sending the first indication message to the first node according to a control policy.

Further, the sender 1402 is further configured to send a query message before sending the first auxiliary stream to the fourth node, where the query message is used to query whether the fourth node may receive the first auxiliary stream.

The receiver 1403 is further configured to receive a confirmation message sent by the fourth node, where the confirmation message is used to indicate that the fourth node may receive the first auxiliary stream.

For a method for controlling multiple auxiliary streams by using the control device, reference may be made to the descriptions in Embodiment 1 and Embodiment 2, and details are not described again in this embodiment of the present disclosure.

This embodiment of the present disclosure provides a control device, including a processor determines to allocate a token to m auxiliary streams, and allocates a token to the m auxiliary streams, where the m auxiliary streams belong to n node, $n \geq 1$, $m \geq 2$, and $m \geq n$, then, a sender sends a token allocated to an auxiliary stream of a first node to the first node, where the first node is one node of the n node such that the first node may acquire the token, then, the sender sends a first indication message to the first node, where the first indication message is used to instruct the first node to send a first auxiliary stream according to the received token such that the first node may send the first auxiliary stream after receiving the first indication message, where the first auxiliary stream includes at least one auxiliary stream of the m auxiliary streams. By using the control device provided in this embodiment of the present disclosure, simultaneously sending auxiliary streams by multiple nodes may ultimately be implemented.

Embodiment 6

Figure 16:
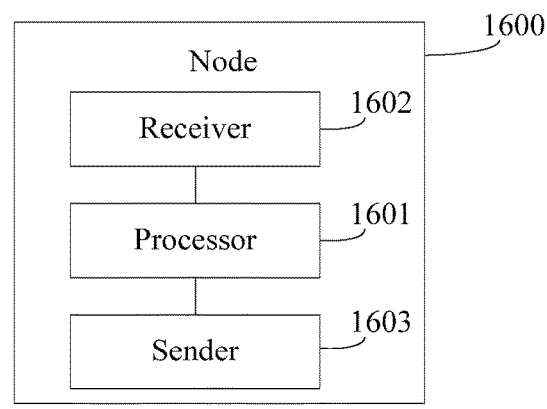
FIG. 16 is a schematic diagram of a structure of a node according to an embodiment of the present disclosure.

An embodiment of the present disclosure provides a node 1600. As shown in FIG. 16, the node 1600 includes a processor 1601, a receiver 1602, and a sender 1603.

The processor 1601 is configured to acquire, from a control device, a token required by at least one auxiliary stream.

The processor 1601 is further configured to determine a type of the token.

The receiver 1602 is configured to receive a first indication message sent by the control device, where the first indication message is used to instruct the node 1600 to send a first auxiliary stream.

The sender 1603 is configured to send the first auxiliary stream according to the type that is of the token and is determined by the processor 1601 when the token that is required by the at least one auxiliary stream and is acquired by the processor 1601 includes a token required by the first auxiliary stream.

Further, the sender 1603 is further configured to, before the processor 1601 acquires, from the control device, the token required by the at least one auxiliary stream, send a request message to the control device, where the request message is used to request to acquire the token required by the at least one auxiliary stream.

In a possible implementation manner, the type of the token is a first token corresponding to the node and is a token for multiple auxiliary streams.

The sending, by the sender 1603, the first auxiliary stream according to the determined type of the token when the token required by the at least one auxiliary stream includes a token required by the first auxiliary stream further includes establishing M auxiliary stream channels corresponding to the token required by the first auxiliary stream, where M is a quantity of auxiliary streams included in the first auxiliary stream, and sending the first auxiliary stream through the M auxiliary stream channels.

In a possible implementation manner, the token is a first token corresponding to the node and is a token for a single auxiliary stream.

The sending, by the sender 1603, the first auxiliary stream according to the determined type of the token when the token required by the at least one auxiliary stream includes a token required by the first auxiliary stream further includes establishing one auxiliary stream channel corresponding to the token required by the first auxiliary stream, and when a quantity of auxiliary streams included in the first auxiliary stream is at least two, synthesizing the auxiliary streams included in the first auxiliary stream such that the first auxiliary stream becomes one auxiliary stream, and sending the synthesized first auxiliary stream through the established auxiliary stream channel, or when a quantity of auxiliary streams included in the first auxiliary stream is one, sending the first auxiliary stream through the established auxiliary stream channel.

In a possible implementation manner, the token is a second token corresponding to an auxiliary stream, or the token is a child token that is corresponding to an auxiliary stream and has a corresponding parent token, where the parent token is a first token corresponding to the node.

The sending, by the sender 1603, the first auxiliary stream according to the determined type of the token when the token required by the at least one auxiliary stream includes a token required by the first auxiliary stream further includes establishing M auxiliary stream channels corresponding to the token required by the first auxiliary stream, where M is a quantity of auxiliary streams included in the first auxiliary stream, and sending the first auxiliary stream through the M auxiliary stream channels.

Further, the token is the child token that is corresponding to an auxiliary stream and has a corresponding parent token.

The processor 1601 is further configured to, after the sender 1603 sends the request message to the control device, and before the token required by the at least one auxiliary stream is acquired from the control device, acquire, from the control device, a parent token of a node corresponding to the at least one auxiliary stream, where the parent token includes at least one idle child token in order to acquire the token required by the at least one auxiliary stream.

Optionally the sender 1603 is further configured to, before the processor 1601 acquires, from the control device, the token required by the at least one auxiliary stream, send auxiliary stream resource information of the node 1600 to the control device such that after determining, according to the auxiliary stream resource information, an auxiliary stream to which a token may be allocated, the control device matches the auxiliary stream to which a token may be allocated with a reserved token and performs management, and allocates, with reference to an allocation policy, the token to the at least one auxiliary stream, where the auxiliary stream resource information is information that represents an auxiliary stream included in the node 1600.

Further, the auxiliary stream resource information further includes a quantity of auxiliary streams included in the node 1600, and/or a type of an auxiliary stream included in the node 1600, and/or a brief description of an auxiliary stream included in the node 1600.

In a possible implementation manner, the auxiliary stream resource information includes a node number of the node 1600.

The sending, by the sender 1603, auxiliary stream resource information of the node 1600 to the control device such that after determining, according to the auxiliary stream resource information, an auxiliary stream to which a token may be allocated, the control device matches the auxiliary stream to which a token may be allocated with a reserved token and performs management, and allocates, with reference to an allocation policy, the token to the at least one auxiliary stream further includes sending the auxiliary stream resource information of the node 1600 to the control device such that after determining, according to the auxiliary stream resource information, the auxiliary stream to which a token may be allocated, the control device matches the auxiliary stream to which a token may be allocated with the reserved token and performs management according to a first rule, and allocates, with reference to the allocation policy, the token to the at least one auxiliary stream, where the first rule is as follows: a token is allocated by node 1600, and auxiliary streams with a same node 1600 number are allocated a same token.

In a possible implementation manner, the auxiliary stream resource information includes an identifier of an auxiliary stream included in the node 1600.

The sending, by the sender 1603, auxiliary stream resource information of the node 1600 to the control device such that after determining, according to the auxiliary stream resource information, an auxiliary stream to which a token may be allocated, the control device matches the auxiliary stream to which a token may be allocated with a reserved token and performs management, and allocates, with reference to an allocation policy, the token to the at least one auxiliary stream further includes sending the auxiliary stream resource information of the node 1600 to the control device such that after determining, according to the auxiliary stream resource information, the auxiliary stream to which a token may be allocated, the control device matches the auxiliary stream to which a token may be allocated with the reserved token and performs management according to a second rule, and allocates, with reference to the allocation policy, the token to the at least one auxiliary stream, where the second rule is as follows: a token is allocated by auxiliary stream, and auxiliary streams with different auxiliary stream identifiers are allocated different tokens.

In a possible implementation manner, the auxiliary stream resource information includes a node number of the node 1600, and an identifier of an auxiliary stream included in the node 1600.

The sending, by the sender 1603, auxiliary stream resource information of the node 1600 to the control device such that after determining, according to the auxiliary stream resource information, an auxiliary stream to which a token may be allocated, the control device matches the auxiliary stream to which a token may be allocated with a reserved token and performs management, and allocates, with reference to an allocation policy, the token to the at least one auxiliary stream further includes sending the auxiliary stream resource information of the node 1600 to the control device such that after determining, according to the auxiliary stream resource information, the auxiliary stream to which a token may be allocated, the control device matches the auxiliary stream to which a token may be allocated with the reserved token and performs management according to a third rule, and allocates, with reference to the allocation policy, the token to the at least one auxiliary stream, where the third rule is as follows: a parent token is allocated by node 1600, and auxiliary streams with a same node number are allocated a same parent token, for auxiliary streams that have a same parent token, a child token is allocated by auxiliary stream, and auxiliary streams with different auxiliary stream identifiers are allocated different child tokens.

For a method for controlling multiple auxiliary streams with reference to the node, reference may be made to the descriptions in Embodiment 1 and Embodiment 2, and details are not described again in this embodiment of the present disclosure.

This embodiment of the present disclosure provides a node, including a processor acquires, from a control device, a token required by at least one auxiliary stream, and determines a type of the token, and a receiver receives a first indication message sent by the control device, where the first indication message is used to instruct the node to send a first auxiliary stream, and then, when the token that is required by the at least one auxiliary stream and is acquired by the processor includes a token required by the first auxiliary stream, the first auxiliary stream is sent according to the type that is of the token and determined by the processor. Based on the node provided in this embodiment of the present disclosure, when the control device controls different nodes to simultaneously send auxiliary streams, sending, by the nodes, the auxiliary streams to the control device may be implemented.

Embodiment 7

Figure 17:
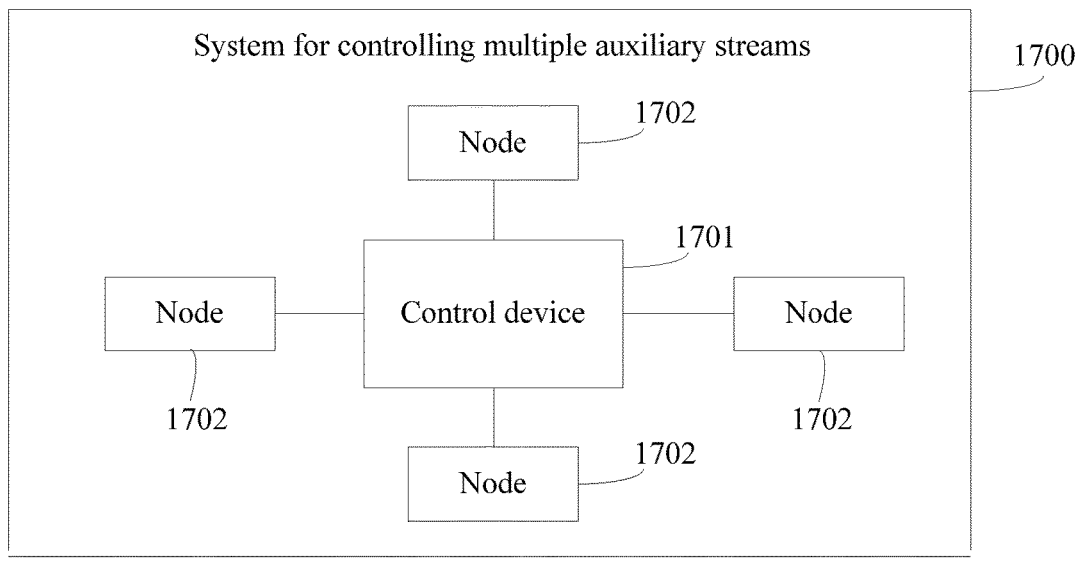
FIG. 17 is a schematic diagram of a structure of a system for controlling multiple auxiliary streams according to an embodiment of the present disclosure.

An embodiment of the present disclosure provides a system 1700 for controlling multiple auxiliary streams. As shown in FIG. 17, the system 1700 includes a control device 1701 and a node 1702.

The control device 1701 is configured to determine to allocate a token to m auxiliary streams, and allocate a token to the m auxiliary streams, where the m auxiliary streams belong to n node 1702, n≥1, m≥2, and m≥n.

The control device 1701 is further configured to send a token allocated to an auxiliary stream of a first node to the first node, where the first node is one node 1702 of the n node.

The first node is configured to acquire, from the control device 1701, a token required by at least one auxiliary stream, and determine a type of the token.

The control device 1701 is further configured to send a first indication message to the first node, where the first indication message is used to instruct the first node to send a first auxiliary stream according to the received token, and the first auxiliary stream includes at least one auxiliary stream of the m auxiliary streams.

The first node is further configured to receive the first indication message sent by the control device 1701, and when the token required by the at least one auxiliary stream includes a token required by the first auxiliary stream, send the first auxiliary stream according to the determined type of the token.

It should be noted that only four nodes are listed in the system 1700 for controlling multiple auxiliary streams shown in FIG. 17. Certainly, a quantity of nodes may be 1, 2, 3, 4 . . . . This embodiment of the present disclosure provides only an exemplary system for controlling multiple auxiliary streams, and does not limit a quantity of nodes included in the system.

It should be noted that the first node is one node of the n node 1702, and the system 1700 for controlling multiple auxiliary streams that is shown in FIG. 17 may include one first node, or may include multiple first nodes, which is not limited in this embodiment of the present disclosure.

For a method used by the system 1700 for controlling multiple auxiliary streams to control multiple auxiliary streams, reference may be made to the descriptions in Embodiment 1 and Embodiment 2, and details are not described again in this embodiment of the present disclosure.

Based on the system for controlling multiple auxiliary streams in this embodiment of the present disclosure, because a control device allocates tokens for auxiliary streams of multiple nodes, after a node acquires a token required by at least one auxiliary stream, the node may send an auxiliary stream to the control device, and then the control device may send the auxiliary stream to another node. In this way, managing and controlling multiple auxiliary streams of multiple nodes may be implemented.

It may be clearly understood by a person skilled in the art that, for the purpose of convenient and brief description, division of the foregoing functional modules is taken as an example for illustrating the apparatus described above. In actual application, the foregoing functions may be allocated to different functional modules and implemented according to a requirement, that is, an inner structure of an apparatus is divided into different functional modules to implement all or some of the functions described above. For a detailed working process of the foregoing apparatus and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several indication messages for instructing a computer device (which may be a personal computer, a server, or a network device) or a processor to perform all or some of the steps of the methods described in the embodiments of the present disclosure. The foregoing storage medium includes any medium that may store program code, such as a universal serial bus (USB) flash drive, a removable hard disk, a read-only memory (ROM), a random-access memory (RAM), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for controlling multiple auxiliary streams, comprising:
   determining whether to allocate a first token to at least one auxiliary stream of m auxiliary streams, the m auxiliary streams belonging to n nodes, the first token being a type of child token corresponding to an auxiliary stream, the child token having a corresponding parent token, the corresponding parent token being a token type corresponding to a node, $n \geq 1$, $m \geq 2$, and $m \geq n$;
   allocating the first token to a first auxiliary stream of the m auxiliary streams, the first auxiliary stream comprising multiple auxiliary streams of the m auxiliary streams;
   allocating a second token to a first node of the n nodes, second token being a parent token to the first token;
   sending the first token and the second token to the first node; and
   sending a first indication message to the first node, the first indication message instructing the first node to send the first auxiliary stream according to the first token.

2. The method according to claim 1, further comprising:
   receiving, before determining whether to allocate the first token, a request message from one of the n nodes requesting to acquire the first token required for sending the first auxiliary stream;
   determining whether to allocate the first token to the first auxiliary stream of the m auxiliary streams by:
      searching, according to the request message, for pre-stored token information, the token information indicating an occupancy status of the first token; and
      determining whether to allocate the first token to the first auxiliary stream of the m auxiliary streams when the token information indicates that the first token is unoccupied;
   allocating the first token to the first auxiliary stream according to the token information; and
   updating the token information after allocating the first token to the first auxiliary stream.

3. The method according to claim 2, wherein the second token is a token type corresponding to a node, the token information comprising:
   a quantity of idle tokens; and
   a correspondence between a used token and a token-allocated node,
   determining whether to allocate the first token to the first auxiliary stream when the token information indicates that the first token is unoccupied comprising determining whether to allocate the first token to the first auxiliary stream when the quantity of idle tokens is not less than n, and
   updating the token information comprising updating, in the token information, the quantity of idle tokens and correspondence information about the correspondence between a used token and a token-allocated node.

4. The method according to claim 2, wherein the first token is a token type corresponding to an auxiliary stream, the token information comprising:
   a quantity of idle tokens; and
   a correspondence between a used token and a token-allocated auxiliary stream of a second node,
   determining whether to allocate the first token to the first auxiliary stream when the token information indicates that the first token is unoccupied comprising determining whether to allocate the first token to the first auxiliary stream when the quantity of idle tokens is not less than m, and
   updating the token information comprising updating, in the token information, the quantity of idle tokens and correspondence information about the correspondence between a used token and a token-allocated auxiliary stream of a second node.

5. The method according to claim 2, wherein the token information comprises:
   a first quantity of idle parent tokens;
   a second quantity of idle child tokens that is part of each idle parent token;
   a first correspondence between a used parent token and a token-allocated node;
   a second correspondence between the used parent token and a quantity of idle child tokens that is part of the used parent token; and
   a third correspondence between a used child token that is part of the used parent token and a token-allocated auxiliary stream,
   determining whether to allocate the first token to the first auxiliary stream when the token information indicates that the first token is unoccupied comprising determining whether to allocate the first token to the first auxiliary stream when a third quantity of tokens requested by a third node of the n nodes is not greater than a fourth quantity of idle child tokens that is part of a second parent token corresponding to the third node,
   a fifth quantity of fourth nodes of the n nodes being not greater than the first quantity of idle parent tokens in the token information,
   a sixth quantity of tokens requested by each fourth node being not greater than a seventh quantity of idle child tokens that is part of a third parent token corresponding to each fourth node,
   the third node being a node to which a used parent token is allocated,
   the fourth node being a node to which no parent token is allocated, and
   updating the token information comprising updating, in the token information, the first quantity of idle parent tokens, the second quantity of idle child tokens that is part of each idle parent token, the first correspondence between a used parent token and a token-allocated node, the second correspondence between a used parent token and a quantity of idle child tokens that is part of the used parent token, and the third correspondence between a used child token that is part of a used parent token and a token-allocated auxiliary stream.

6. The method according to claim 1, wherein before determining whether to allocate the first token to the first auxiliary stream, the method further comprises:
receiving auxiliary stream resource information reported by a controlled node, the auxiliary stream resource information representing a second auxiliary stream that is part of the controlled node;
determining, according to the auxiliary stream resource information, a third auxiliary stream for token allocation;
matching a reserved token with the third auxiliary stream in order to acquire a correspondence between a fourth token and a fourth auxiliary stream;
determining whether to allocate the first token to the first auxiliary stream further according to an allocation policy; and
allocating the first token to the first auxiliary stream further according to the acquired correspondence.

7. The method according to claim 6, wherein the auxiliary stream resource information comprises a node number corresponding to a fifth auxiliary stream that is part of each controlled node, matching the reserved token with the third auxiliary stream comprising matching, according to a first rule, the reserved token with the third auxiliary stream, and the first rule being as follows:
a token is allocated by node; and
auxiliary streams with a same node number are allocated with a same token.

8. The method according to claim 6, wherein the auxiliary stream resource information comprises an identifier of each auxiliary stream that is part of each controlled node, and matching the reserved token with the third auxiliary stream comprising matching, according to a second rule, the reserved token with the third auxiliary stream, and the second rule being as follows:
a token is allocated by auxiliary stream; and
auxiliary streams with different auxiliary stream identifiers are allocated with different tokens.

9. The method according to claim 6, wherein the auxiliary stream resource information comprises:
a node number corresponding to each auxiliary stream that is part of each controlled node; and
an identifier of each auxiliary stream that is part of each controlled node, and
matching the reserved token with the third auxiliary stream comprising matching, according to a third rule, the reserved token with the third auxiliary stream, and the third rule being as follows:
a parent token is allocated by node;
auxiliary streams with a same node number are allocated with a same parent token; and
for auxiliary streams that have a same parent token, a child token is allocated by auxiliary stream and auxiliary streams with different auxiliary stream identifiers are allocated different child tokens.

10. The method according to claim 1, further comprising:
allocating a third token to a second auxiliary stream, the second auxiliary stream comprising at least one auxiliary stream of the m auxiliary streams, the at least one auxiliary stream of the third token being different from the multiple auxiliary streams of the first token, and the third token being a child token of the second token; and
sending the third token to the first node.

11. The method according to claim 10, wherein the first node can transmit a number of auxiliary streams equal to the number of streams allocated to the first token and the third token.

12. A method for controlling multiple auxiliary streams, comprising:
acquiring, by a first node from a control device, a first token required by a first auxiliary stream comprising a multiple auxiliary stream subset of the multiple auxiliary streams;
acquiring, by the first node from the control device, a second token, the second token being a parent token to the first token;
determining, by the first node, a type of the first token, the first token being a type of child token corresponding to an auxiliary stream;
receiving, by the first node, a first indication message sent by the control device, the first indication message instructing the first node to send the first auxiliary stream; and
sending, by the first node, the first auxiliary stream according to the determined type of the first token.

13. The method according to claim 12, wherein the type of the first token is a token type corresponding to a node, and sending the first auxiliary stream comprising:
establishing M auxiliary stream channels corresponding to the first token required by the first auxiliary stream, M being a quantity of second auxiliary streams that is part of the first auxiliary stream; and
sending the first auxiliary stream through the M auxiliary stream channels.

14. The method according to claim 12, wherein the first token is a token type corresponding to an auxiliary stream and sending the first auxiliary stream comprising:
establishing M auxiliary stream channels corresponding to the first token required by the first auxiliary stream, M being a quantity of second auxiliary streams that is part of the first auxiliary stream; and
sending the first auxiliary stream through the M auxiliary stream channels.

15. A control device comprising:
a memory storing computer executable program codes;
a communication interface; and
a processor coupled to the memory and the communication interface, the program codes comprising instructions that when executed by the processor, cause the processor to:
determine whether to allocate a token to at least one auxiliary stream of m auxiliary streams, the m auxiliary streams belonging to n nodes, the token being a type of child token corresponding to an auxiliary stream, the child token having a corresponding parent token, the corresponding parent token being a token type corresponding to a node, $n \geq 1$, $m \geq 2$, and $m \geq n$;
allocate the token to a first auxiliary stream, the first auxiliary stream comprising multiple auxiliary streams of the m auxiliary streams;
allocate a second token to a first node of the n nodes, the second token being a parent token to the token;
send the token and the second token to the first node; and
send a first indication message to the first node, the first indication message instructing the first node to send the first auxiliary stream according to the token.

* * * * *

UNITED STATES PATENT AND TRADEMARK OFFICE
CERTIFICATE OF CORRECTION

PATENT NO. : 10,455,195 B2
APPLICATION NO. : 15/136478
DATED : October 22, 2019
INVENTOR(S) : Jing Xiao, Jing Wang and Jiaoli Wu Page 1 of 1

It is certified that error appears in the above-identified patent and that said Letters Patent is hereby corrected as shown below:

In the Claims

Claim 1, Column 55, Line 37: "second token" should read "the second token"

Signed and Sealed this
Tenth Day of December, 2019

Andrei Iancu
*Director of the United States Patent and Trademark Office*